United States Patent [19]
Murakami et al.

[11] Patent Number: 5,121,633
[45] Date of Patent: Jun. 16, 1992

[54] SEMICONDUCTOR ACCELEROMETER

[75] Inventors: Koichi Murakami; Hiroyuki Kaneko; Kraisorn Throngnumchai, all of Yokohama, Japan

[73] Assignee: Nissan Motor Co., Ltd., Yokohama, Japan

[21] Appl. No.: 285,696

[22] Filed: Dec. 16, 1988

[30] Foreign Application Priority Data

Dec. 18, 1987 [JP] Japan .................. 62-318752
Dec. 21, 1987 [JP] Japan .................. 62-321589
Dec. 24, 1987 [JP] Japan .............. 62-194829[U]

[51] Int. Cl.⁵ .................................... G01P 15/08
[52] U.S. Cl. ............................. 73/517 R; 338/46
[58] Field of Search ........... 73/517 R; 338/5, 46

[56] References Cited

U.S. PATENT DOCUMENTS

| 4,829,822 | 5/1989 | Imai et al. ............... 73/517 R X |
| 4,882,933 | 11/1989 | Petersen et al. ............. 73/517 R |
| 4,891,985 | 1/1990 | Glenn ..................... 73/517 R |
| 4,901,570 | 2/1990 | Chang et al. ............. 73/517 AV |

FOREIGN PATENT DOCUMENTS

| 48-102988 | 12/1973 | Japan . |
| 61-97572 | 5/1986 | Japan . |
| 144576 | 7/1986 | Japan ................... 73/517 R |
| 1-69366 | 7/1989 | Japan ................... 73/517 R |
| 2207758 | 2/1989 | United Kingdom ............ 73/517 R |

OTHER PUBLICATIONS

Barth, P. W. et al., *A monolithic Silicon Accelerometer with Integral Air Damping and Overrange Protection*, THO 215-4/88/0000 pp. 35-38, 1988.

L. Roylance, "IEEE Transactions on Electron Devices", *A Batch-Fabricated Silicon Accelerometer*, vol. ED-26, No. 12, Dec. 1979, pp. 1911-1917.

*Primary Examiner*—Hezron E. Williams
*Assistant Examiner*—Joseph W. Roskos
*Attorney, Agent, or Firm*—Foley & Lardner

[57] ABSTRACT

A semiconductor accelerometer including a weight, a support frame surrounding the weight with a gap therebetween, at least one beam for connecting the weight to the support frame, a piezoresistor attached onto the beam for detecting acceleration, and stoppers for restricting the movement of the weight relative to the support frame, in which at least one first projection integrally mounted to the weight and at least one second projection integrally mounted to the support frame cooperate to function as the stoppers. At least one first cross member and at least one second cross member may cooperate with the first and second projections. First and second stopping members may also cooperate with the first and second projections.

13 Claims, 24 Drawing Sheets

SEMICONDUCTOR ACCELEROMETER

BACKGROUND OF THE INVENTION

1. Field of the Invention

The present invention relates to a semiconductor accelerometer provided with stoppers to be batch-fabricated.

2. Description of the Background Art

One example of a conventional semiconductor accelerometer is described in an article entitled "A Batch-Fabricated Silicon Accelerometer", I.E.E.E. Transactions on Electron Devices, Vol. ED-26, No. 12, December 1979, pp. 1911-1917, as shown in FIG. 1.

In FIG. 1, this conventional semiconductor accelerometer comprises a silicon substrate 1, a rectangular silicon center mass or weight 3 arranged in the central portion thereof, a silicon cantilevered beam 2 for supporting the silicon weight 3 to the silicon substrate 1 with a gap 4 between the silicon substrate 1 and the silicon cantilevered beam 2 and the silicon weight 3, and a piezoresistor 5 attached to the surface portion of the silicon cantilevered beam 2.

When the accelerometer is subjected to an acceleration, the weight 3 is moved to deflect the cantilevered beam 2, thereby causing stress in the cantilevered beam 2. As a result, the piezoresistor 5 formed on the surface of the cantilevered beam 2 changes its resistance due to a piezoresistive effect. By detecting the change in the resistance, the acceleration can be detected.

In FIG. 2, there is shown a mounting structure of the above described sensor chip, i.e., the semiconductor accelerometer, including upper and lower stoppers 6 and 7 mounted to the upper and lower surfaces of the semiconductor accelerometer, for preventing the cantilevered beam 2 from breaking due to excessive acceleration applied to the beam 2 when, for example, dropping the accelerometer.

This conventional semiconductor accelerometer and its mount structure have several problems.

Firstly, in the manufacturing process of the accelerometer, no protector for stopping the excessive displacement of the weight is provided after the formation of the cantilevered beam before the formation of the stoppers. Therefore, the accelerometer must be handled carefully, so as not to break the cantilevered beam, and productivity is lowered.

Secondly, the stopper forming process is complicated, which increases costs. One of reasons why the accelerometer is formed from the semiconductor is to effect cost reduction per chip by fabricating many chips using a batch process, i.e., many chips are formed on a wafer and processed in the same time to obtain chips of stable quality and low cost. However, since the stoppers are attached to the upper and lower surfaces of the accelerometer after the formation of the cantilevered beam in the wafer process, as shown in FIG. 2, this advantage of batch fabrication is lost, and costs increase greatly.

Thirdly, it is difficult to form the stoppers accurately. To meet the design requirements of the cantilevered beam, the gaps between the stoppers and the weight are controlled, to be accurately formed as small as several $\mu m$ to several tens $\mu m$ in the structure shown in FIG. 2. The stopper are required to be formed accurately and attached to the accelerometer correctly. Hence, high technologies in preparing and bonding the stoppers are required and, thus, the cost increases.

Further, in the accelerometer described above, an additional metal weight may be attached onto the silicon weight 3 in order to minimize the sensitivity of another axis, but the thickness of this additional metal weight tends to vary and to deteriorate the accuracy of the gap between the stoppers and the metal weight on the silicon weight.

FIG. 3 illustrates one example of a conventional method of manufacturing semiconductor accelerometers such as the one described above using an electrochemical etching technique, as disclosed in Japanese Patent Laid-Open Specification No. 61-97572, entitled "Method of Manufacturing Semiconductor Accelerometers". In this method, an n-type silicon is used as an anode, and a p-type silicon is selectively etched using an alkali etching solution.

In FIG. 3(a), first, an n-type silicon layer 12 and a p-type silicon window 13 of predetermined thicknesses are formed on a (100) surface of a p-type silicon substrate 11. The n-type silicon layer 12 is formed by using a thermal diffusion method or an epitaxial growing method, while the p-type silicon window 13 is formed by using the thermal diffusion method or by leaving a part of the p-type silicon layer when the n-type silicon layer 12 is formed in the p-type silicon layer by the thermal diffusion method. A piezoresistor 5 is formed in a predetermined surface region of the n-type silicon layer 12 by using the thermal diffusion method or ion implantation method.

In FIG. 3(b), a $SiO_2$ or $Si_3N_4$ film acting as a silicon etching mask is formed in predetermined regions on the back of the p-type silicon substrate 11. Then, while the n-type silicon layer 12 is used as an anode, the selective etching of the p-type silicon substrate 11 is carried out in the electrochemical etching method using the alkali etching solution. As a result, the silicon support 1, the silicon weight 3, the silicon cantilevered beam 2 and the gap 4 are simultaneously formed.

This conventional method of manufacturing semiconductor accelerometers has the following problems:

(1) The electrochemical etching method exhibits excessive anisotropy, and the etching is stopped by a (111) surface. Therefore, as shown in FIG. 4, the stress may concentrates in corners Y and break the silicon cantilevered beam 2 due to the concentrated stress.

(2) The etching is stopped by the (111) surface, and a p-type silicon structure such as the one shown in FIG. 5 may not be etched, thus limiting the structure to be processed.

SUMMARY OF THE INVENTION

An object of the present invention is to provide a semiconductor accelerometer with stoppers formed during the formation of an accelerometer chip, i.e., during a wafer process, and which is stable and uniform in quality and is suitable for batch fabrication at low cost.

According to one aspect of the present invention, there is provided a semiconductor accelerometer, comprising a weight; a support frame surrounding the weight with a gap therebetween; at least one beam for connecting the weight to the support frame; means for detecting acceleration, attached onto the beam; and stopper means for restricting the movement of the weight relative to the support frame, the stopper means comprising: at least one first projection integrally mounted to the weight; and at least one second projection integrally mounted to the support frame, the first and second projections overlapping at least their portions with each other in the moving direction of the weight with a certain gap between the first and second projections.

The acceleration detecting means preferably comprises a piezoresistor.

The stopper means may include at least two first projection, integrally mounted to the weight; at least two second projection, integrally mounted to the support frame, the first and second projections alternately aligning in a plane approximately perpendicular to the moving direction of the weight with a first gap between the first and second projections; at least one first cross member crossing over one of the second projections with a second gap therebetween and connecting adjacent two of the first projections; and at least one second cross member crossing over one of the first projections with the second gap therebetween and connecting adjacent two of the second projections.

The stopper means may include at least one first projection integrally mounted to the weight; and at least one second projection integrally mounted to the support frame, the first projection extending toward the support frame to interpose between the second projection and the support frame with certain gaps therebetween.

The stopper means may include at least one first projection integrally mounted to the weight; and at least one second projection integrally mounted to the support frame, the second projection extending toward the weight to interpose between the first projection and the weight with certain gaps therebetween.

The stopper means may include at least two first projections extending from the weight to overlap with the support frame with a certain gap therebetween; and at least two second projections extending from the support to overlap with the weight with the certain gap therebetween, the first and second projections alternately aligning in a plane approximately perpendicular to the moving direction of the weight with a gap between the first and second projections.

The stopper means may also include a first stopping member disposed on the support frame; a second stopping member disposed on the weight; at least two first projections extending from the weight to position under the first stopping member with a certain gap therebetween; and at least two second projections extending from the support frame to position under the second stopping member with the certain gap therebetween, the first and second projections alternately aligning in a plane approximately perpendicular to the moving direction of the weight with a gap between the first and second projections.

BRIEF DESCRIPTION OF THE DRAWINGS

FIG. 1 shows a conventional semiconductor accelerometer.

FIG. 2 shows a mounting structure of the accelerometer of FIG. 13.

FIG. 3 is a cross section showing one embodiment of a conventional method of manufacturing a semiconductor accelerometer of FIG. 1.

FIG. 5 shows a structure having <111> surfaces at which an etching is stopped in a conventional manufacturing method.

FIG. 6 shows a first embodiment of a semiconductor accelerometer according to the present invention.

FIG. 7 is a cross section showing a first manufacturing method of the present invention applicable to the semiconductor accelerometer shown in FIG. 6.

FIG. 15 shows another embodiment of semiconductor accelerometer to the present invention.

FIG. 19 shows another embodiment of a semiconductor accelerometer according to the present invention; FIG. 19(a) is a plan view of this embodiment, while

FIG. 21 shows another embodiment of a semiconductor accelerometer according to the present invention.

DESCRIPTION OF THE PREFERRED EMBODIMENTS

Figure 6A:
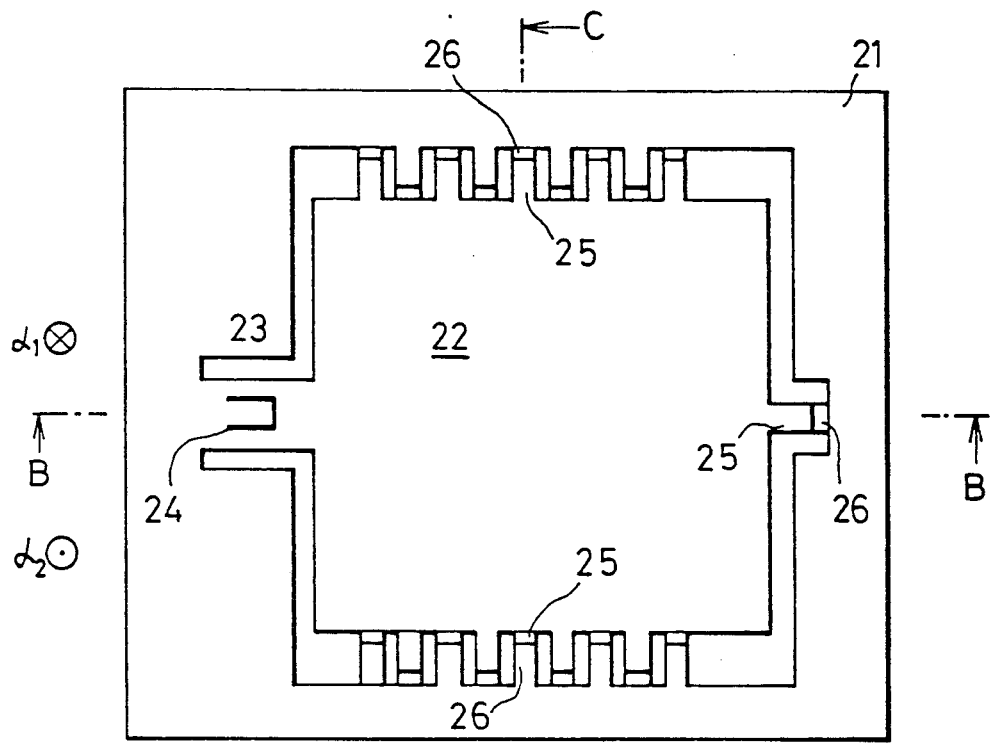
FIG. 6(a) shows the accelerometer in plan view.

Referring now to the drawings, there is shown in FIG. 6 the first embodiment of a semiconductor accelerometer according to the present invention.

In the drawing, the semiconductor accelerometer comprises a silicon support 21, a rectangular silicon center mass or weight 22 arranged in the central opening space thereof, a silicon cantilevered beam 23 for supporting the silicon weight 22 to the silicon support 21 with a gap between the silicon support 21 and the silicon cantilevered beam 23 and the silicon weight 22, and a piezoresistor 24 for detecting acceleration, attached to the surface of the silicon cantilevered beam 23 in the same manner as a conventional semiconductor accelerometer described above.

In this case, the weight 22 is provided with first projections 25, while the support 21 is provided with second projections 26, so that the first projections 25 and the second projections 26 may overlap one another with a predetermined gap 27 between them.

Figure 6B:
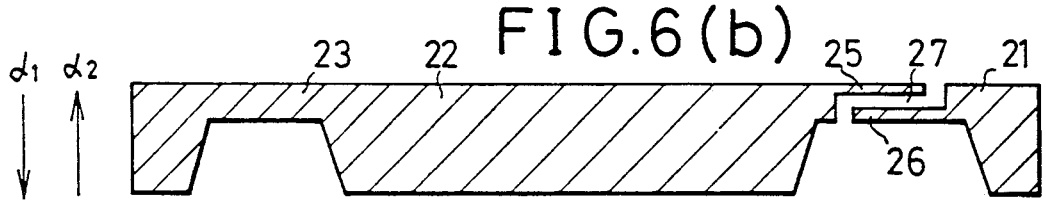
FIG. 6(b) shows a cross section of this accelerometer taken along lines b—b.
Figure 6C:
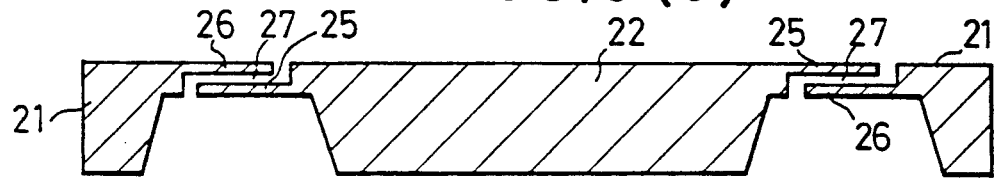
FIG. 6(c) shows a cross section of the accelerometer taken along lines c—c.

As shown in the right-hand sides of FIG. 6(b) and FIG. 6(c), some of the first projections 25 lie above the corresponding second projections 26, while, as shown in the left-hand side of FIG. 6(c), some of the second projections 26 lie above the corresponding first projections 25.

The operation of this semiconductor accelerometer will now be described.

When the accelerometer is subjected to an acceleration in a direction α1 shown in FIG. 6 (from the upside to the underside), the weight 22 is moved in a direction opposite to the direction α1 so that the gap 27 between the first and second projections 25 and 26 shown in the left-hand side of FIG. 6(c) may narrow. When the applied acceleration is excessively large, these first and second projections 25 and 26 may abut against one another to stop the displacement of the weight 22. Accordingly, the cantilever beam 23 will not be given by an excessive stress and be prevented from breaking.

When the accelerometer is subjected to an excessive acceleration in a direction α2 shown in FIG. 6 (from the underside to the upside), the first and second projections 25 and 26 shown in the right-hand sides of FIG. 6(b) and FIG. 6(c) about against one another to stop the displacement of the weight 12 in the same manner as described above.

The gap 27 between the first and second projections 25 and 26 can optionally be determined depending on an acceleration measurement range.

FIG. 7 shows a first manufacturing method for the semiconductor accelerometer shown in FIG. 6.

Figure 7A:
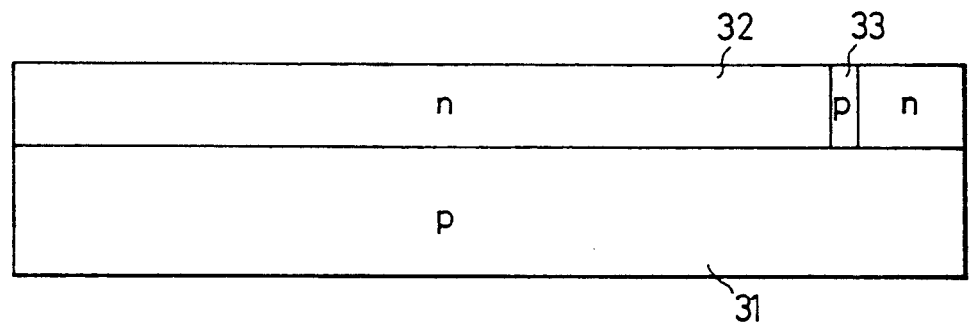
FIGS. 7(a) to (d) illustrate the various steps in the manufacturing of a semiconductor accelerometer according to one embodiment of this invention.

In FIG. 7(a), a lower n-type silicon layer 32 and a lower p-type silicon etching window 33 of a predetermined thickness are formed on a (100) surface of a p-type silicon substrate 31. The lower n-type silicon layer 32 is formed by a thermal diffusion method or by an epitaxial growing method. The lower p-type silicon etching window 33 is formed by the thermal diffusion method, or by leaving not processing a part of the lower p-type silicon layer when the n-type silicon layer 32 is formed in the p-type silicon layer by the thermal diffusion method.

Figure 7B:
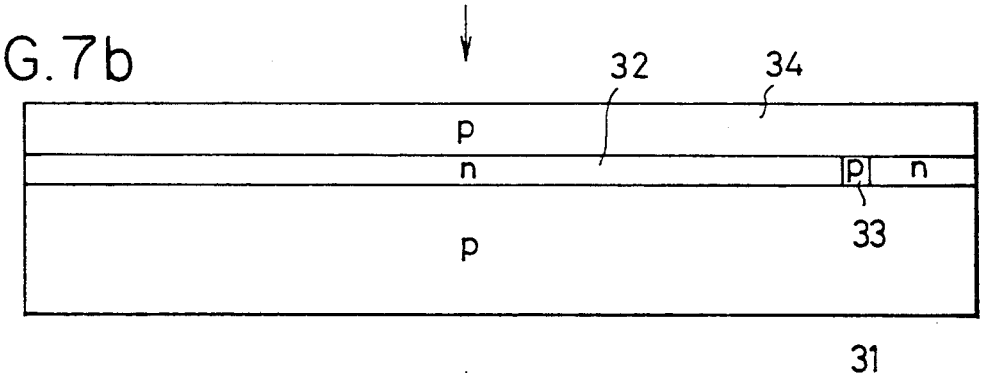

In FIG. 7(b), a p-type silicon layer 34 is formed on the lower n-type silicon layer 32 and on the lower p-type silicon etching window 33 by the thermal diffusion method or the epitaxial growing method. The thickness of the p-type silicon layer 34 determines the interval of the gap 27 between the first and second projections 25 and 26.

Figure 7C:
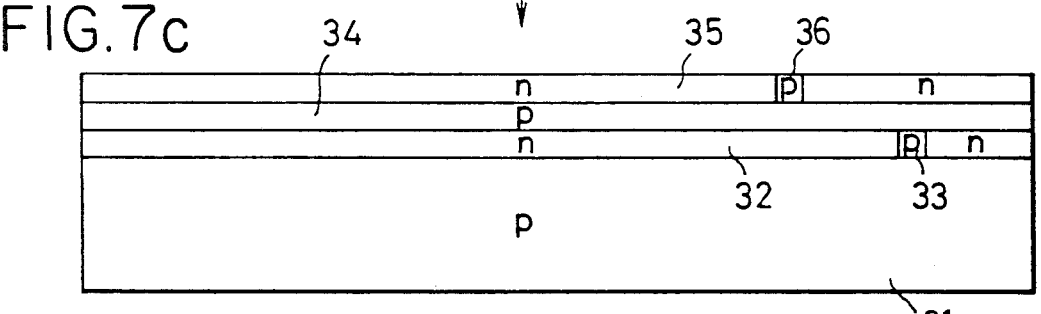

In FIG. 7(c), an upper n-type silicon layer 35 and an upper p-type silicon etching window 36 are formed on the p-type silicon layer 34 in the same manner as the lower n-type silicon layer 32 and lower p-type silicon etching window 33.

Figure 7D:
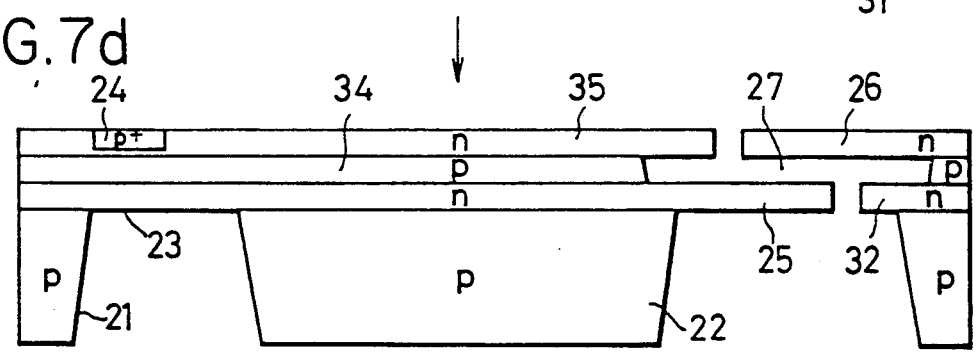

In FIG. 7(d), the piezoresistor 24 is formed in a predetermined surface region of the n-type silicon layer 35 using the thermal diffusion method or ion implantation method. Then after a $SiO_2$ or $Si_3N_4$ film is formed as a silicon etching mask in a predetermined region on the back of the substrate 31, while the lower n-type silicon layer 32 and upper n-type silicon layer 35 are used as anodes, the p-type silicon layers are selectively etched by an electrochemical etching method using an alkali etching solution. Details of the electrochemical etching method are disclosed in Japanese Patent Laid-Open Specification No. 61-97572 entitled "Method of Manufacturing Semiconductor Accelerometers". As a result of the etching, the silicon support 21, silicon weight 22, silicon cantilever beam 23, and first and second projections 25 and 26 constituting the stoppers are simultaneously formed.

As described above, in this embodiment, the stoppers for preventing the cantilever beam 23 from breaking is formed during the wafer process, and thus the yield of the semiconductor accelerometers can be improved as well as the mounting cost can be reduced.

In addition, since the accuracy of the stoppers is determined according to the thickness of the p-type silicon layer 34 formed during the wafer process, the stoppers can be formed quite accurately.

Further, the stoppers can be simultaneously formed with the silicon cantilevered beam 23 using the electrochemical etching method. Hence no particular process is needed to form the stoppers, thereby simplifying the accelerometer manufacturing process.

Figure 8:
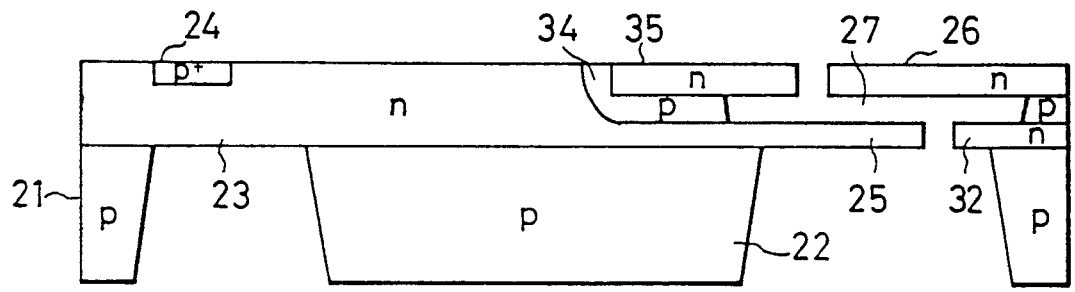
FIG. 8 is a cross section showing a second manufacturing method of the present invention.

In the process shown in FIG. 7, in order to form the first and second projections 25 and 26, the lower n-type silicon layer 32, p-type silicon layer 34 and upper n-type silicon layer 35 are formed over the entire surface of the substrate 31. These layers 32, 34 and 35 may be formed only on the partial area where the projections 25 and 26 are to be formed. One example of this second manufacturing method is shown in FIG. 8, and the manufacturing process is carried out in the same manner as described above.

Figure 9A:
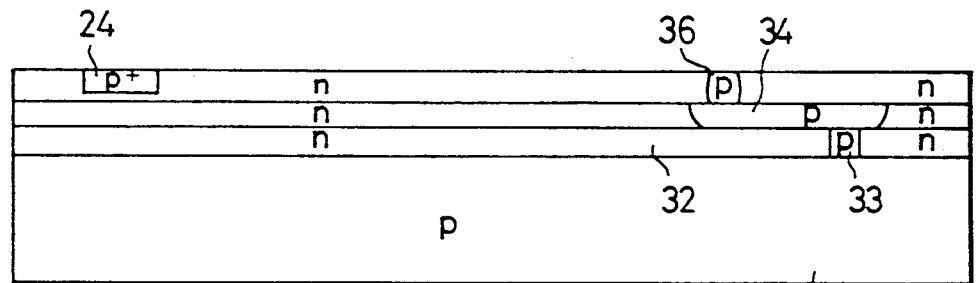
FIGS. 9(a) and (b) show, respectively, the steps in the third manufacturing method for the accelerometer.
Figure 9B:
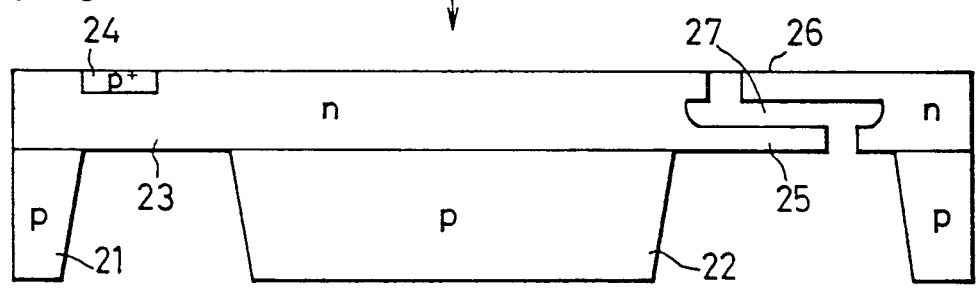
FIG. 9 is a cross section showing a third manufacturing method of the present invention.

The p-type silicon layer 34 is needed only when the first and second projections 25 and 26 are formed, and therefore, after the formation of the projections 25 and 26, the layer 34 may be entirely etched away. One example of this third manufacturing method is shown in FIG. 9, and the accelerometer can be fabricated in the same manner as described above.

Figure 10:
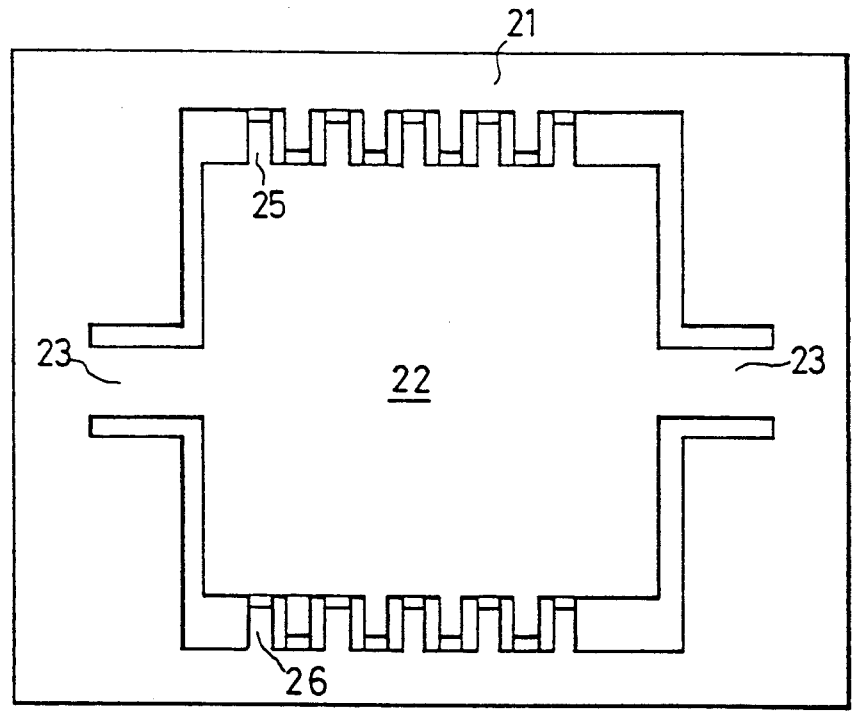
FIG. 10 is a top view of a semiconductor accelerometer provided with plural beams according to the present invention.

The present invention is applicable to not only the cantilevered beam structure shown in FIG. 6 but also a structure with plural beams, such as two beams on opposite sides of the weight, as shown in FIG. 10.

FIG. 11 shows a fourth manufacturing method for the semiconductor accelerometer shown in FIG. 6.

Figure 11A:
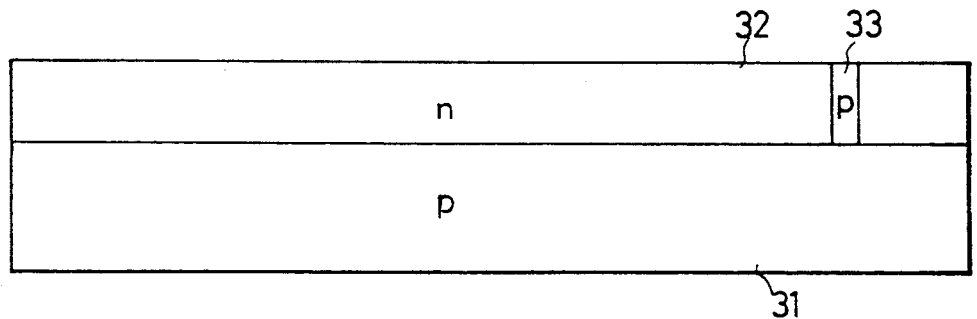
FIG. 11 is a cross section showing in steps (a) to (d) of a fourth manufacturing method of the present invention applicable to the semiconductor accelerometer shown in FIG. 6.

In FIG. 11(a), a lower n-type silicon layer 32 and a lower p-type silicon etching window 33 of a predetermined thickness are formed on a (111) surface of a p-type silicon substrate 41 in the same manner as described above.

Figure 11B:
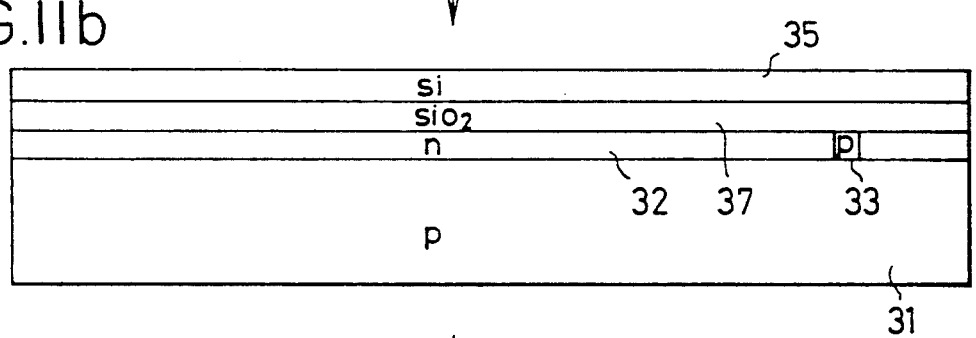

In FIG. 11(b), an SiO$_2$ layer 37 is formed on the lower n-type silicon layer 32 and on the lower p-type silicon etching window 33 using an oxygen ion implantation method. On the SiO$_2$ layer 50, a silicon layer 35 is formed by the epitaxial growing method. The thickness of the SiO$_2$ layer 50 determines the interval of the gap 27 between the first and second projections 25 and 26.

Figure 11C:
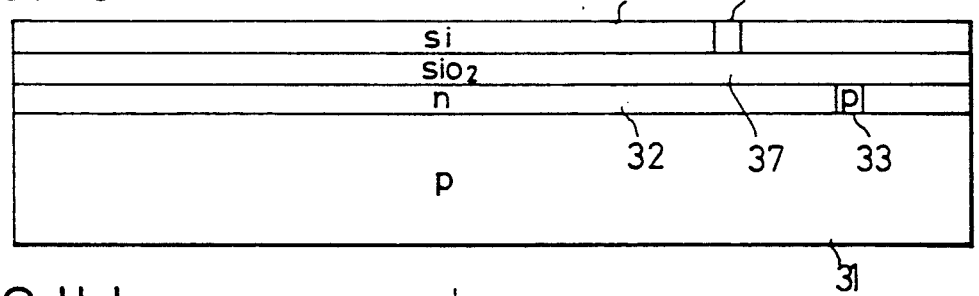

In FIG. 11(c), an upper etching window 36 is formed in a predetermined region of the silicon layer 35. When the upper p-type silicon etching window 36 is formed, the thermal diffusion method may be used, and, when the upper SiO$_2$ etching window 36 is formed, the predetermined region of the silicon layer 35 may be thermally oxidized.

Figure 11D:
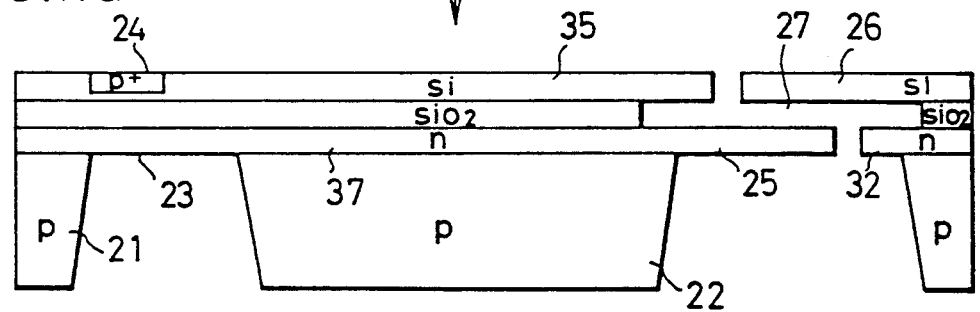

In FIG. 11(d), the piezoresistor 24 and the SiO$_2$ or Si$_3$N$_4$ film as a silicon etching mask are formed in the same manner as described above. Then, while the lower n-type silicon layer 42 and silicon layer 45 are used as anodes, the predetermined regions of the silicon substrate 31 as well as the lower p-type silicon etching window 33 are etched by the electrochemical etching method with the alkali etching solution. When the upper etching window 36 is of the p-type silicon, it is etched at this time. Finally, the SiO$_2$ layer 37 is etched. When the upper etching window 36 is of the SiO$_2$, it is etched at this time. As a result, the silicon support 21, the silicon weight 22, the silicon cantilevered beam 23, and the first and second projections 25 and 26 constituting the stoppers are simultaneously formed.

FIG. 13 shows a fifth manufacturing method for the semiconductor accelerometer shown in FIG. 6.

Figure 3A:
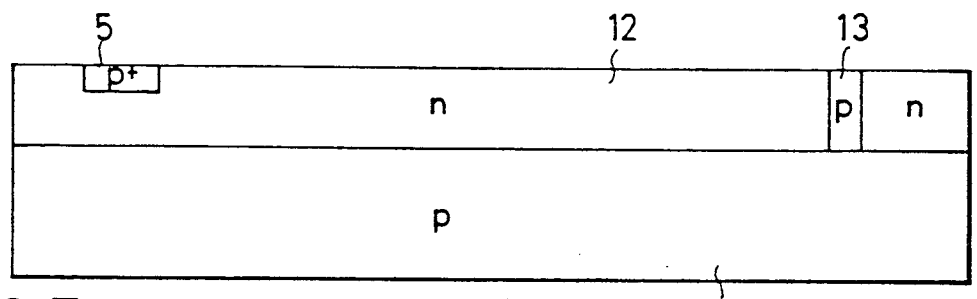
FIG. 3(a) is a cross-section of a prior art semiconductor accelerometer having an N-type silicon as an anode.
Figure 3B:
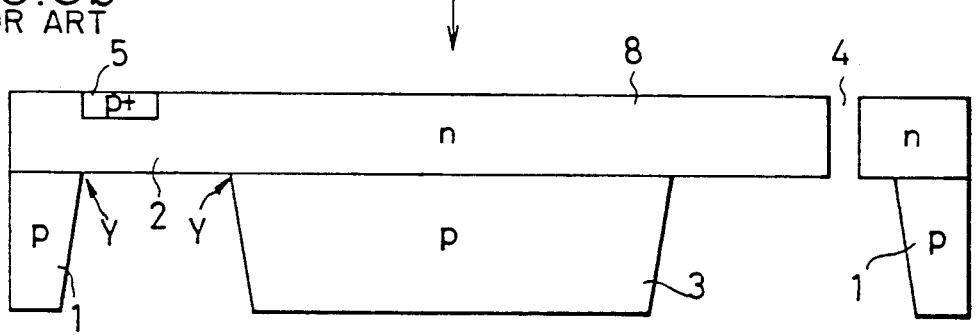
FIG. 3(b) is a cross section of a semiconductor accelerometer formed by electrochemical etching.
Figure 4:
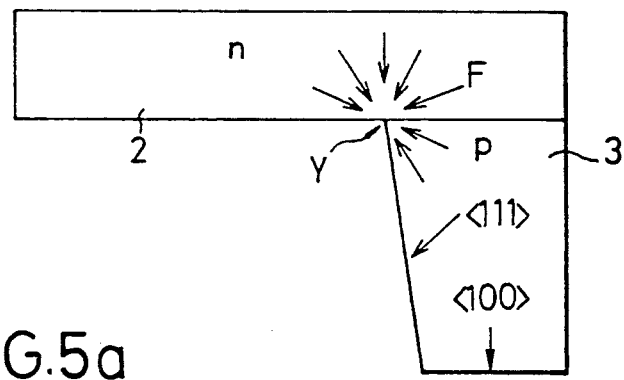
FIG. 4 is a cross section showing a corner of the semiconductor accelerometer of FIG. 3.
Figure 5A:
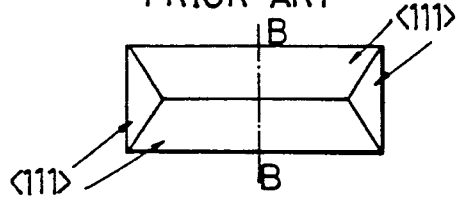
FIG. 5(a) shows the surfaces 111 in plan view.
Figure 5B:
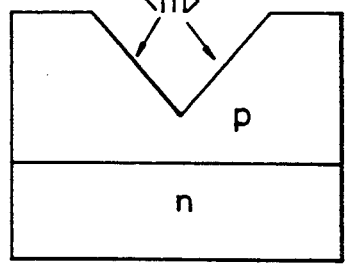
FIG. 5(b) shows the etched surfaces 111 in elevation.

This manufacturing method uses an isotropic etching technique to selectively etch the p-type silicon layers to solve the problems of the conventional method described with reference to FIGS. 3, 4 and 5.

Figure 13A:
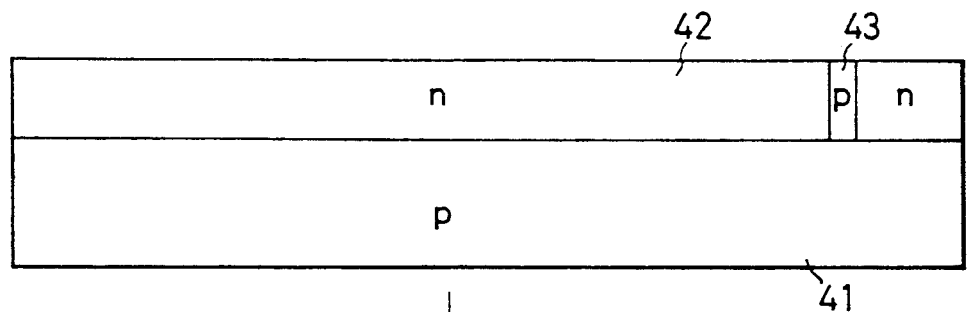
FIG. 13 is a cross section showing in step (a) to (e) of a fifth manufacturing method of the present invention applicable to the semiconductor accelerometer shown in FIG. 6.

In FIG. 13(a), a lower n-type silicon layer 42 and a lower p-type silicon etching window 43 of a predetermined thickness are formed on a p-type silicon substrate 41 in the same manner as described above.

Figure 13B:
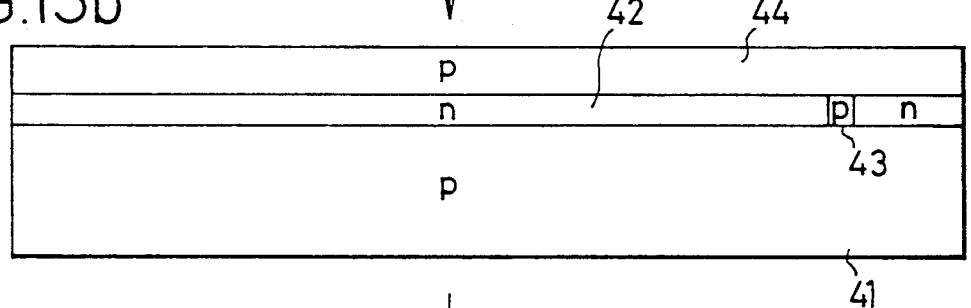

In FIG. 13(b), a p-type silicon layer 44 is formed on the lower n-type silicon layer 42 and lower p-type silicon etching window 43 by the thermal diffusion method or the epitaxial method. The thickness of the p-type silicon layer 44 determines the interval of the gap 27 between the first and second projections 25 and 26.

Figure 13C:
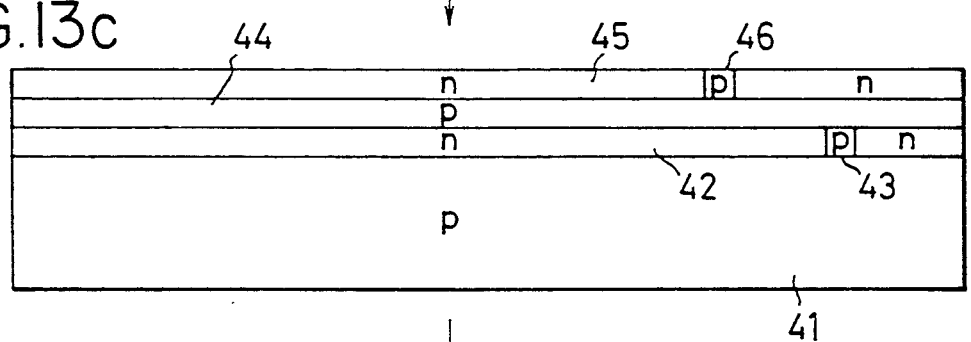

In FIG. 13(c), an upper n-type silicon layer 45 and an upper p-type silicon etching window 46 are formed on the p-type silicon layer 44 in the same manner as the lower n-type silicon layer 42 and the lower p-type silicon etching window 43.

Figure 13D:
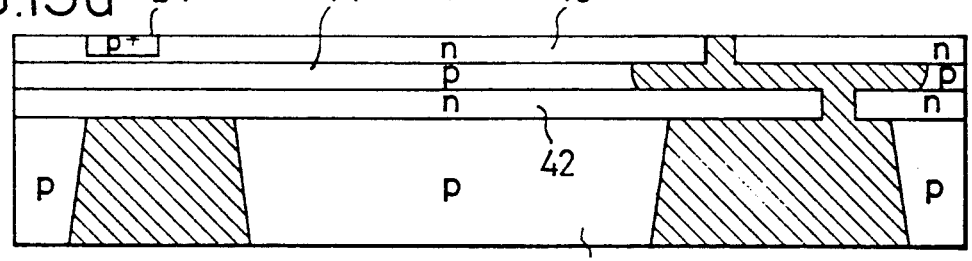

In FIG. 13(d), the piezoresistor 24 and the SiO$_2$ or Si$_3$N$_4$ film acting as a mask are formed in the same manner as described above. Then, the p-type silicon layers are treated in hydrofluoric acid by an anode processing method to make porous p-type silicon layers. Details of this anodizing process are disclosed in Japanese Patent Laid-Open Specification No. 48-102988.

Figure 13E:
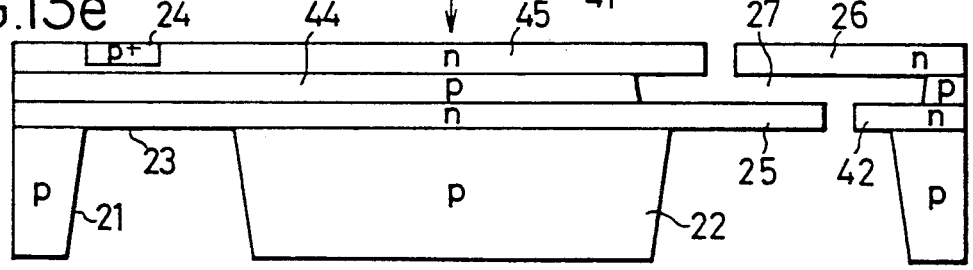

In FIG. 13(e), the porous p-type silicon layers are etched isotropically, and the oxidized film is also etched. As a result, the silicon support 21, the silicon weight 22, the silicon cantilevered beam 23, and the first and second projections 25 and 26 constituting the stoppers are simultaneously formed.

Figure 12:
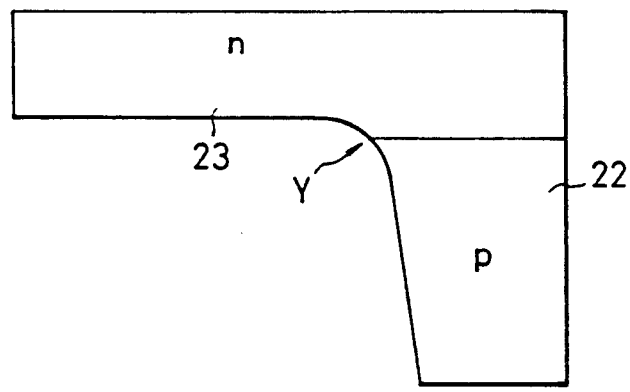
FIG. 12 is a cross section of a semiconductor accelerometer having a rounded corner according to the present invention.

In this manufacturing method, the isotropic etching process is carried out. Therefore, unlike the conventional anisotropic etching, stress concentrating corners such as the corner Y shown in FIG. 4 are never formed, but round corners such as a corner Y shown in FIG. 12 at which no stress concentrates, are formed.

In this embodiment, since no stress concentrates t the corners, the silicon cantilevered beam can resist a higher load. In addition, the isotropic etching is not stopped by the (111) surface of the substrate, and hence the desired structure such as the one shown in FIG. 5 can be readily formed.

Figure 1A:
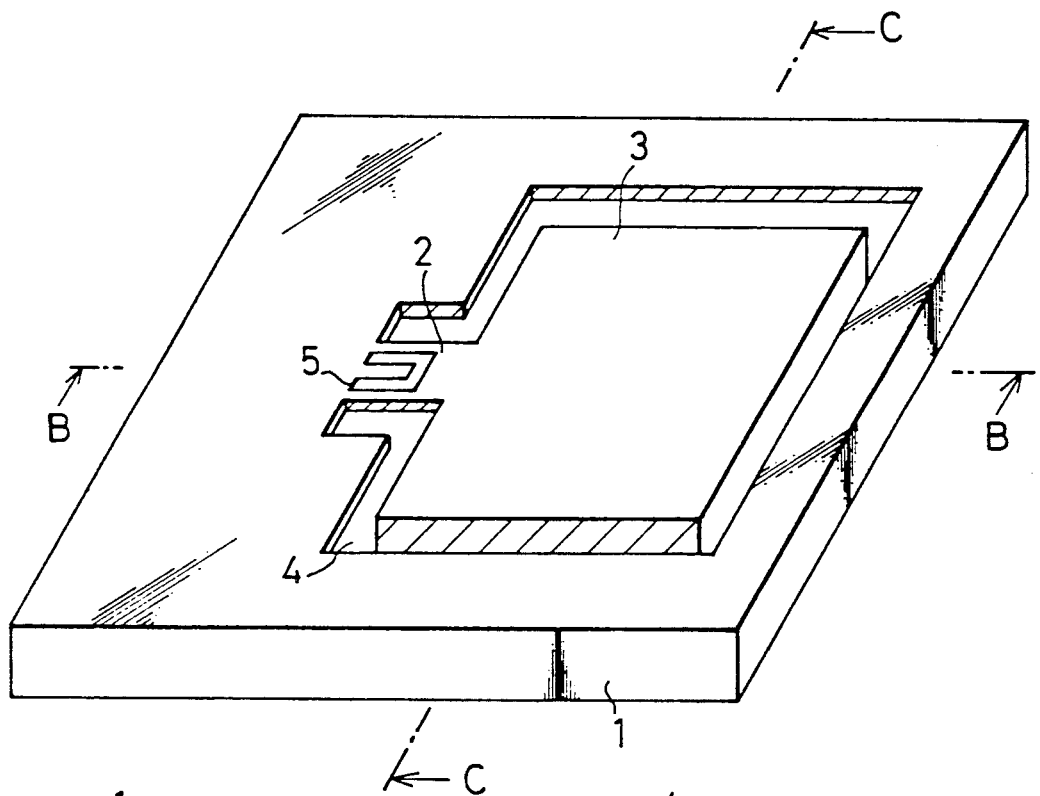
FIG. 1(a) shows the semiconductor accelerometer in perspective.
Figure 1B:
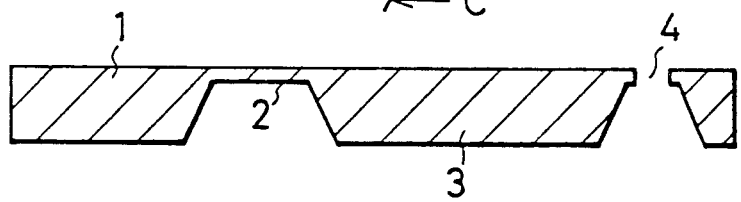
FIG. 1(b) shows an elevation of the accelerometer taken along lines b—b.
Figure 1C:
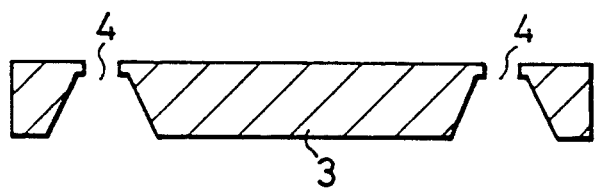
FIG. 1(c) shows another elevation of the accelerometer taken along lines c—c.
Figure 2A:
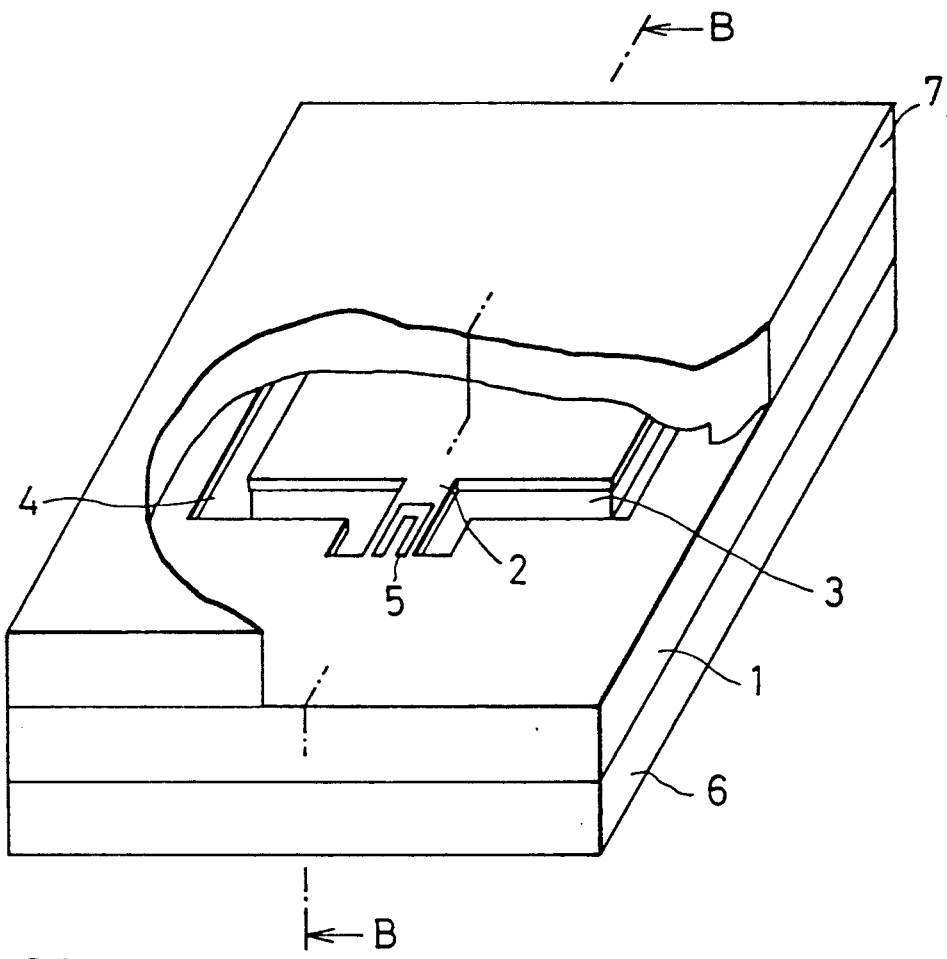
FIG. 2(a) is a partially broken perspective view of the accelerometer, including upper and lower stoppers therefor.
Figure 2B:
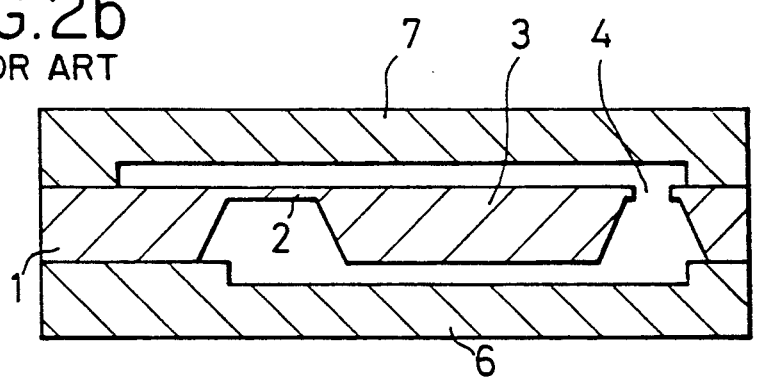
FIG. 2(b) is an elevation taken along lines b—b.

In this case, the silicon cantilevered beam 13 and the stoppers for preventing the cantilevered beam 13 from breaking can be formed simultaneously. This manufacturing method is also applicable to a conventional semiconductor accelerometer such as the one shown in FIG. 1 to form a structure to which no stress concentrates, thereby improving the load bearing capacity of the silicon cantilevered beam.

Similar to the first manufacturing method shown in FIG. 7, this manufacturing method can be modified in the same manner as those shown in FIGS. 8 and 9.

FIG. 14 shows a sixth manufacturing method for the semiconductor accelerometer shown in FIG. 6.

Figure 14A:
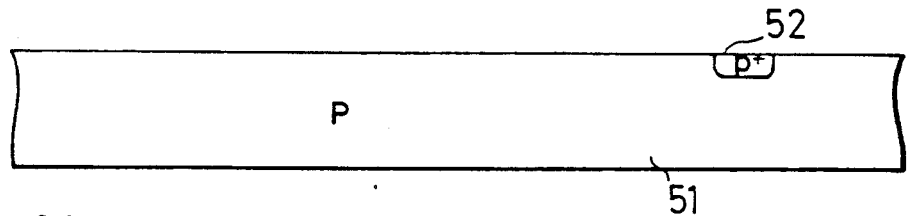
FIG. 14 is a side view showing in steps (a) to (j) of a sixth manufacturing method of the present invention applicable to the semiconductor accelerometer shown in FIG. 6.

In FIG. 14(a), a high-concentration p$^+$-type buried region 52 is formed in a predetermined region on a (100) surface of a p-type silicon substrate 51.

Figure 14B:
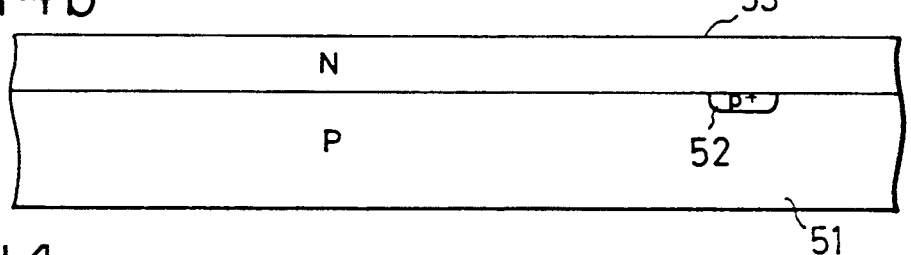

In FIG. 14(b), an n-type silicon layer 53 of a predetermined thickness (for example 10 $\mu$m) is grown on the entire surface of the substrate 51 by the epitaxial growing method.

Figure 14C:
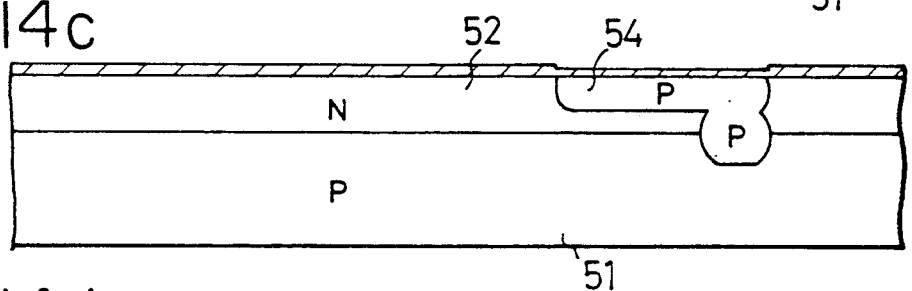

In FIG. 14(c), a second p-type region 54 is formed in a partial region of the n-type silicon layer 53 by the impurity diffusion. At this time, the high-concentration p$^+$-type buried region 52 is also diffused upward so that the upper part of the high-concentration p$^+$-type buried region 52 may be connected with the lower part of the p-type region 54.

Figure 14D:
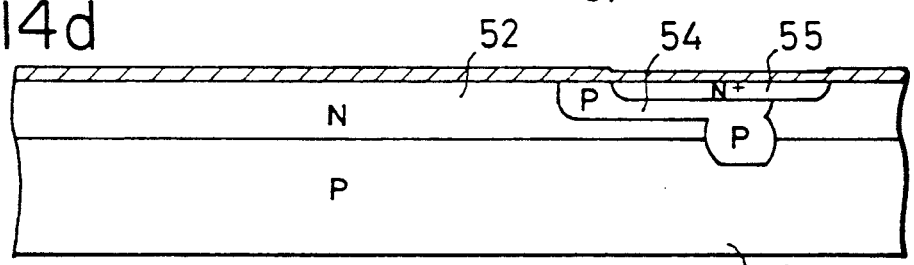
Figure 14E:
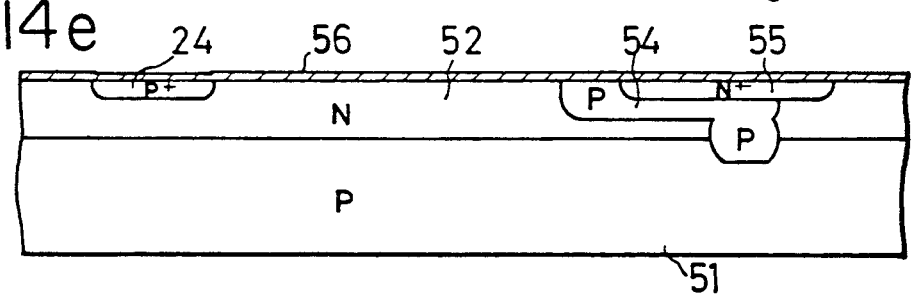

In FIG. 14(d), a high-concentration n$^+$-type region 55 is formed in a predetermined surface region of the p-type region 54 and the n-type silicon layer 53. The region 55 will form the projections for the stoppers. Further, the high-concentration n$^+$-type region 55 may be formed as an ohmic contact region for the n-type silicon layer 53, as occasion demands, when carrying out the electrochemical etching at the later stage.

In FIG. 14(c), a p-type impurity is doped in a predetermined region to form the piezoresistor 24. A $SiO_2$ or $Si_3N_4$ film is formed as a surface protective insulation film 56.

Figure 14F:
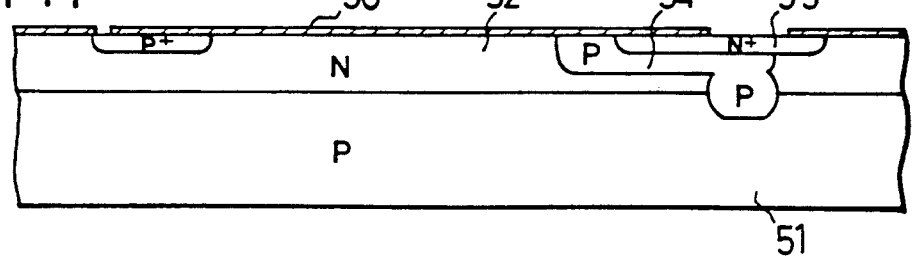
Figure 14A:
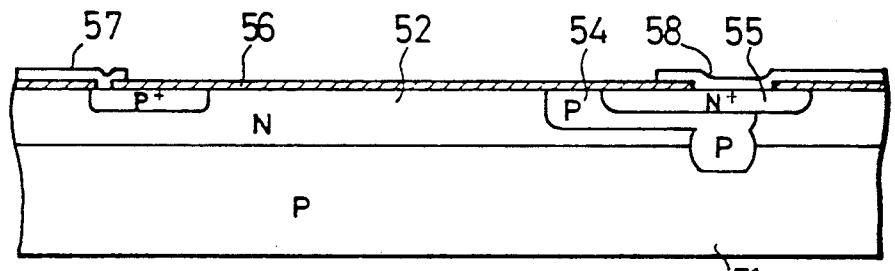
Figure 14B:
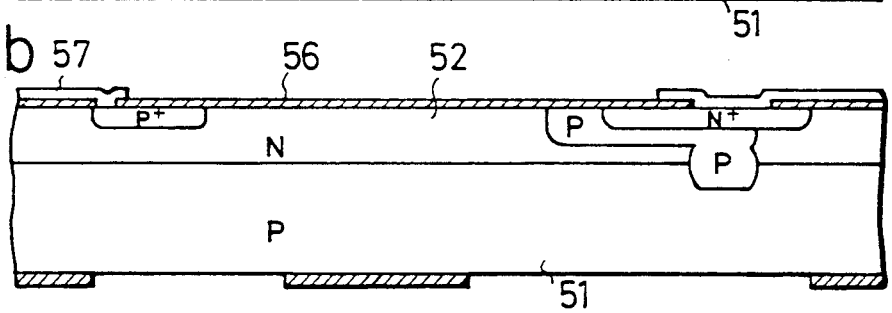
Figure 14C:
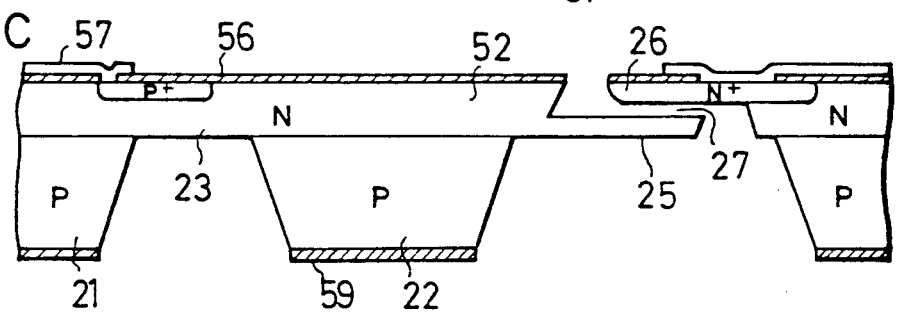
Figure 14D:
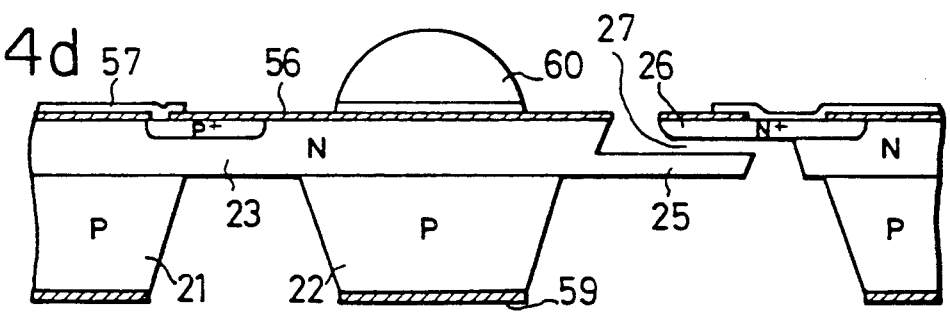

In FIG. 14(f), predetermined regions of the surface protective film 56 are removed by photoetching.

In FIG. 14(g), a piezoresistor lead 57 and a voltage applying electrode 58 for the electrochemical etching are formed. The load 57 and electrode 58 may be formed from a monolayer or a composite layer made of metal such as Al, Cr, Au, Ti and Ni.

In FIG. 14(h), a $SiO_2$ or $Si_3N_4$ film is formed as a silicon etching mask 59 in a predetermined region on the back of the substrate 51.

In FIG. 14(i), the voltage applying electrode 58 is used as an anode, and the silicon etching is carried out by the electrochemical etching using the alkali etching solution. As a result, the support 21, the silicon weight 22, the silicon cantilevered beam 23, the first and second projections 25 and 26, and the gap 27 between the first and second projections 25 and 26 are formed. The interval of the gap 27 is determined by the difference between the dopings of the p-type region 54 and the high-concentration $n^+$-type region 55.

In this manufacturing method, although the voltage applying electrode 58 used for the electrochemical etching is formed together with the piezoresistor lead 57, however, the lead 57 may firstly be formed, and then the electrode 58 may be formed on the entire surface through the insulating film.

In FIG. 14(j), a metal weight 60 may be formed on the silicon weight 22. This metal weight 30 may be formed by a plating method, an adhering method or a soldering method.

In FIG. 15, there is shown another embodiment of a semiconductor accelerometer according to the present invention. The accelerometer, having basically the same structure as the accelerometer shown in FIG. 6, comprises a silicon support 71, a silicon cantilevered beam 72, a rectangular silicon center mass or weight 73 and a piezoresistor 78 formed on the surface of the silicon cantilevered beam 72.

The support 71 is provided with projections 75, while the weight 73 is provided with projections 74 on its periphery. The projections 74 and 75 are alternately and separately arranged in a flat plane. Adjacent two projections 74 of the weight 73 are connected to each other through cross members 76 under each of which one of the projections 75 of the support 71 lies with a gap 81 between them, while adjacent two projections 75 of the support frame 71 are connected to each other through cross members 77 under each of which one of the projections 74 of the weight 73 lies with the gap 81 between them. The projections 74 and 75 and the cross members 76 and 77 constitute stoppers.

The interval of the gap 81 can properly be determined to, for example, several μm. This gap interval is set to sufficiently larger than the displacement of the weight 73 to be moved in response to the applied acceleration within its measurement range.

Figure 15A:
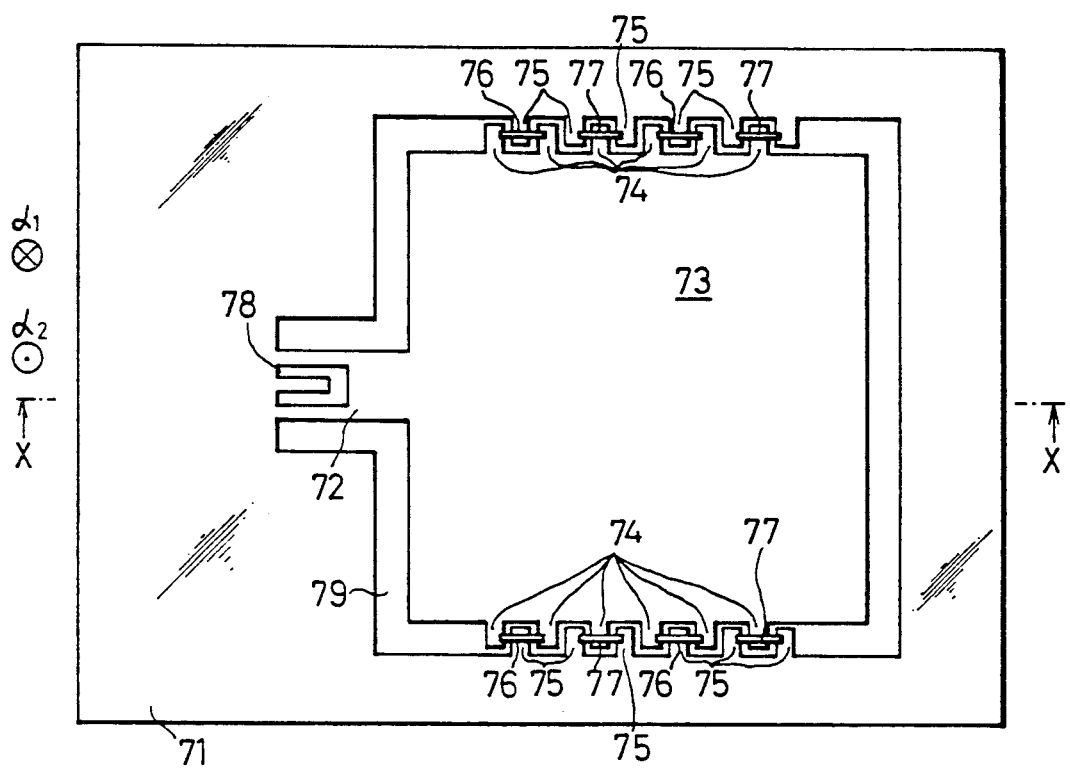
FIG. 15(a) shows a plan view of another embodiment.

In this embodiment, when the acceleration is applied to the accelerometer in the direction α1 shown in FIG. 15(a) (from the upside to the underside), the weight 73 is moved in a direction opposite to the direction α1, and the gap 81 between the cross members 77 of the support 71 and the projections 74 of the weight 73 is narrowed. When the excessive acceleration is added, the displacement of the weight 73 is stopped by the cross members 77 of the support 71 to prevent the cantilevered beam 72 from breaking in the same manner as the accelerometer shown in FIG. 6.

When excessive acceleration is given to the accelerometer in the direction α2, the projections 75 of the support 71 are stopped by the cross members 76 of the weight 73 and the displacement of the weight 73 is stopped accordingly to prevent the cantilevered beam 72 from breaking in the same manner as the accelerometer shown in FIG. 6.

FIG. 16 shows a seventh manufacturing method for the semiconductor accelerometer shown in FIG. 15.

Figure 15B:
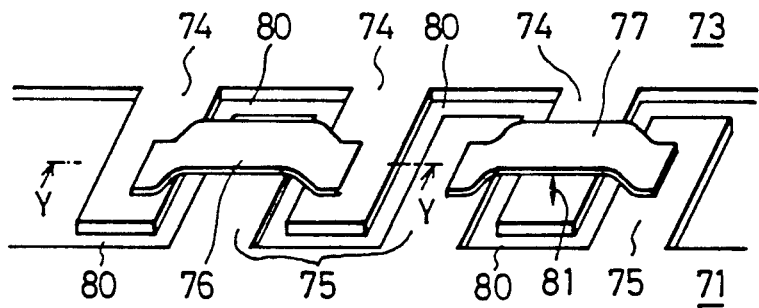
FIG. 15(b) shows details of this embodiment, including a stopper mechanism.

In FIG. 16, the left-hand side is a sectional view, taken along the line X—X of FIG. 15(a), and the right-hand side is a sectional view, taken along the line Y—Y of FIG. 15(b).

Figure 16A:
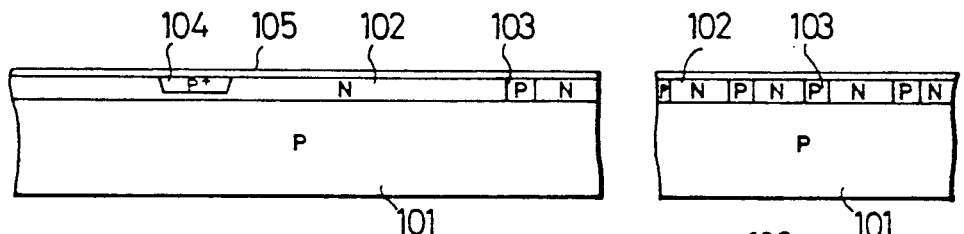
FIG. 16 is a cross section showing in steps (a) to (f) of a seventh manufacturing method of the present invention applicable to the semiconductor accelerometer shown in FIG. 15.

In FIG. 16(a), an n-type silicon layer 102 of a predetermined thickness (for example, 10 μm) is grown on a (100) surface of a p-type silicon substrate 101 by the epitaxial growing method. A p-type region 103 is formed in a part of the n-type silicon layer 102 by the impurity doping so as to reach the silicon substrate 101. The p-type region 103 will form a gap 113 and a gap 115 for projections. A piezoresistor 104 is formed by doping a p-type impurity into the surface region of the n-type silicon layer 102. An insulating film such as a $SiO_2$ or $Si_3N_4$ film is formed as a surface protective film 105.

Figure 16B:
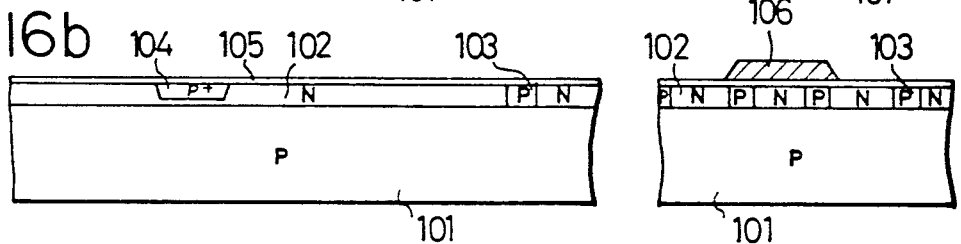

In FIG. 16(b), spacers 106 are formed by patterning thin films of PSC or polycrystalline silicon in the thickness of several μm on the surface protective film 105 in the stopper formation regions.

Figure 16C:
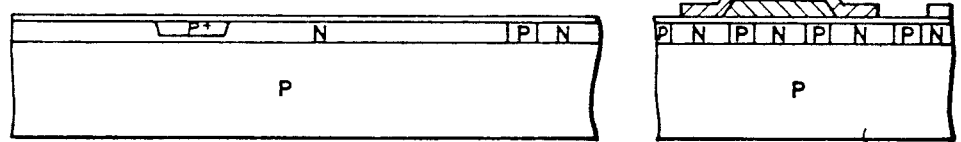

In FIG. 16(c), the cross members 107 bridging over the spacers 106 are formed by patterning thin films of material such as $Si_3N_4$ or polycrystalline silicon different from the material of the spacers 106.

Figure 16D:
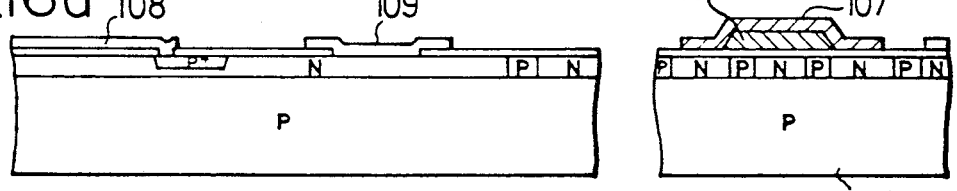

In FIG. 16(d), certain regions of the surface protective film 105 are removed by photoetching to form a piezoresistor lead 108 and a voltage applying electrode 109 to be used for the electrochemical etching. The lead 108 and electrode 109 may be prepared by a monolayer film or a composite film of Al, Cr, Au, Ti or Ni.

Figure 16E:
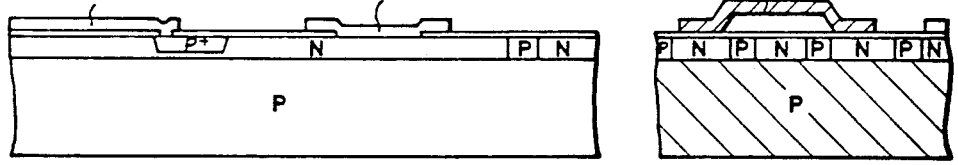

In FIG. 16(e), the spacers 106 are removed by etching to form bridging stoppers, i.e., the cross members 107. In this etching process, the other portions of the surface of the chip are covered with a proper resist or wax at need.

Figure 16F:
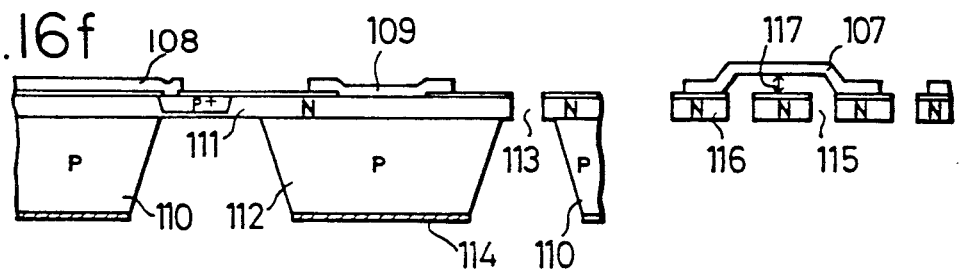

In FIG. 16(f), a $SiO_2$ or $Si_3N_4$ film as a silicon etching mask 114 is formed in predetermined regions on the back of the silicon substrate 101. While the voltage applying electrode 439 is used as an anode, the silicon layer etching is carried out by the electrochemical etching using the alkali etching solution. As a result, a support 110, a silicon cantilevered beam 111, a silicon weight 112 and the gap 113, as well as, projections 116, cross members 107 and gap 115 are formed at the same time. In this case, the interval of the gap 117 is determined by the thickness of the spacer 106, and hence can be controlled.

Figure 17:
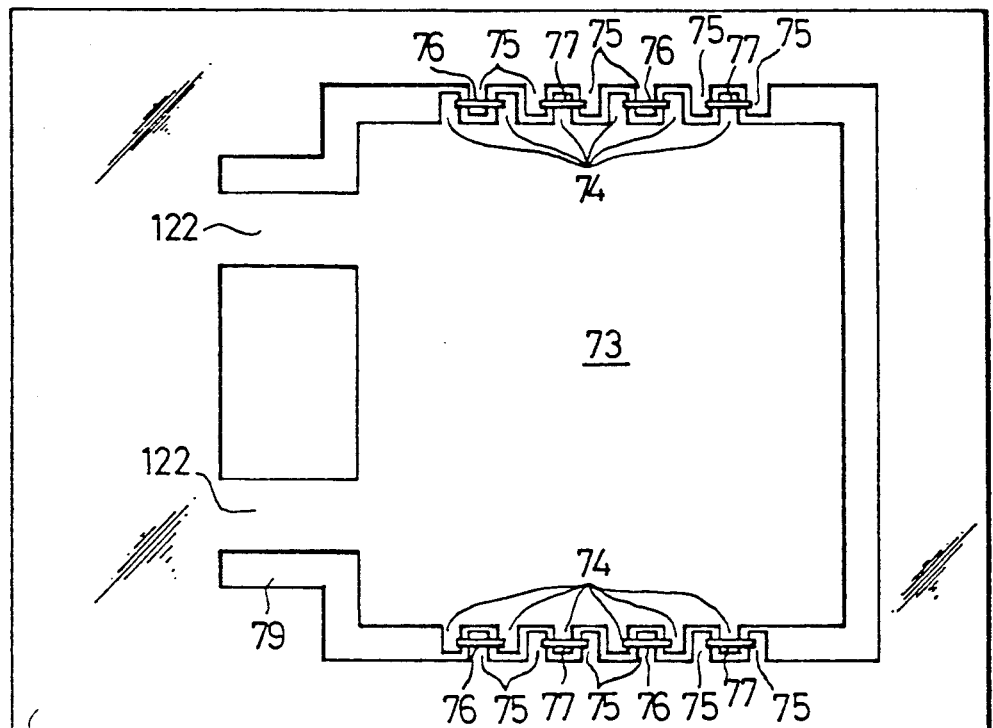
FIG. 17 and 18 are top view of examples of a two-beam semiconductor accelerometer according to the present invention.
Figure 18:
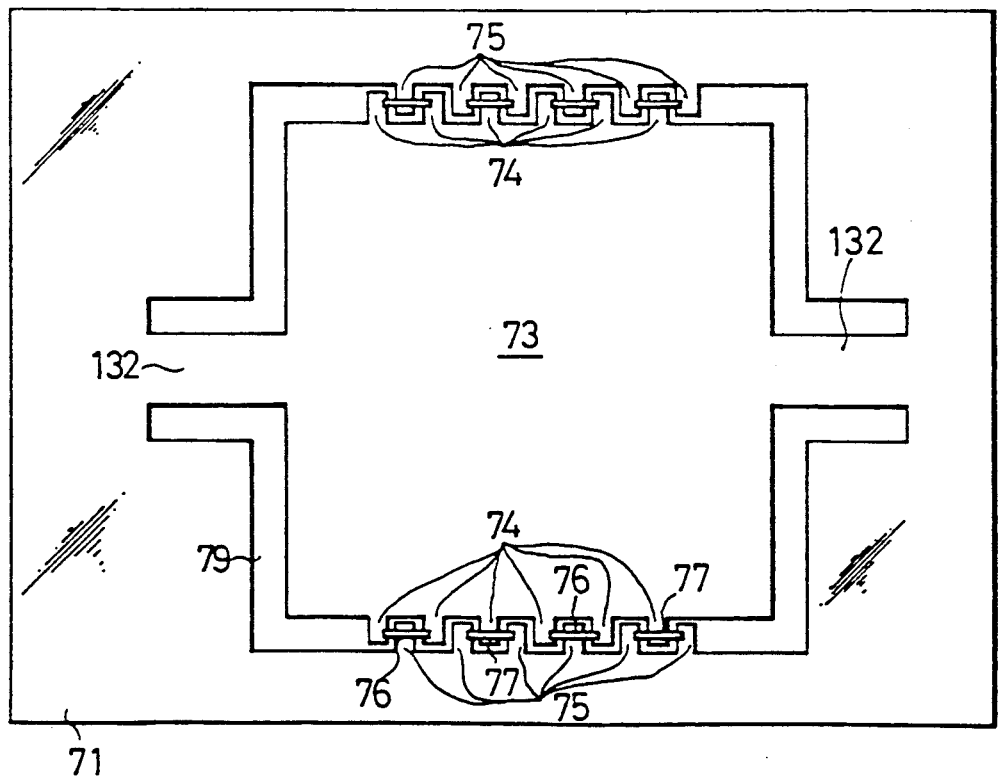

This manufacturing method is applicable to not only the single cantilevered beam structure shown in FIG. 15 but also two beam structures shown in FIGS. 17 and 18, in which semiconductor accelerometers have the same construction as that of FIG. 14, except two beams 122 and 132 formed in one side and opposite sides, respectively.

In this embodiment, two pairs of the cross members and projections for stopping upward and downward movements of the weight are formed on both sides of the weight. However, the numbers and positions of the cross members and projections may be properly determined. In practice, however, the cross members and projections are preferably formed in the vicinity of the center of gravity of the weight, in the light of their functions and effects as the stoppers, which is most effective and has a high shock resistance.

FIG. 19 shows another embodiment of a semiconductor accelerometer according to the present invention, having a similar structure to that shown in FIG. 15.

In this embodiment, flat cross members 86 and 87 are provided instead of the bridging cross members 76 and 77 of FIG. 15, and projections 85 and 84 crossing the respective flat cross members 86 and 87 are thinned on their upper surfaces to form a gap 81 therebetween.

Figure 19A:
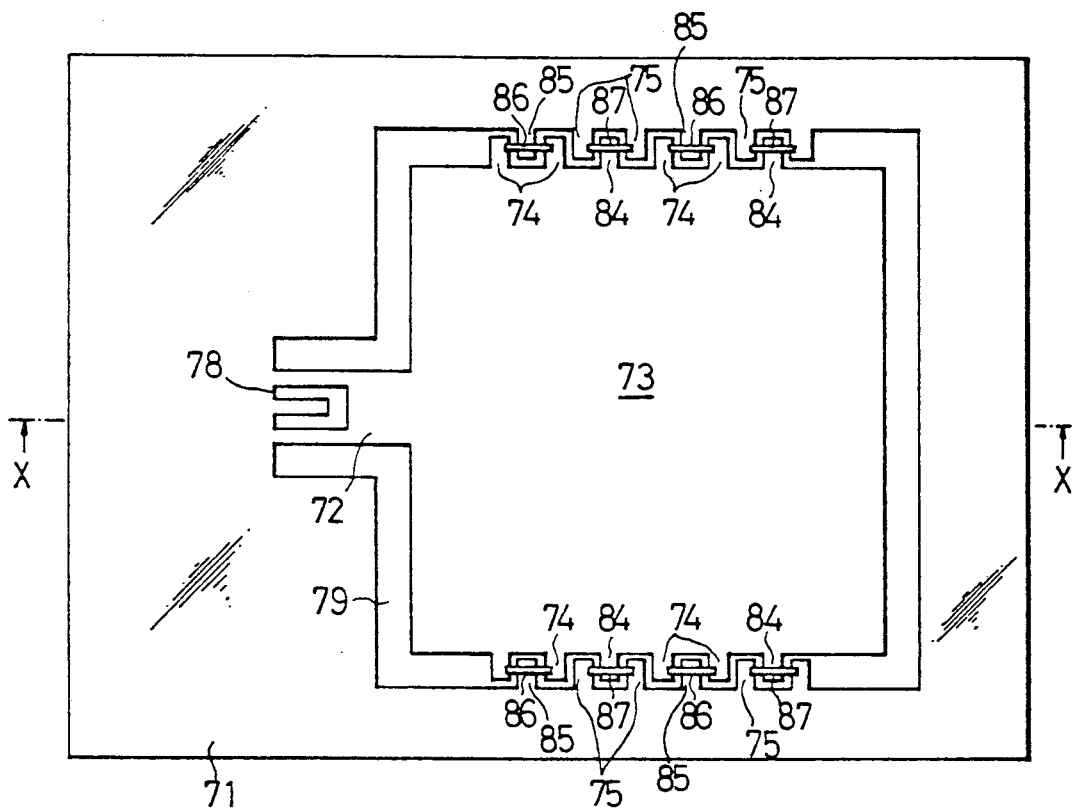
Figure 19B:
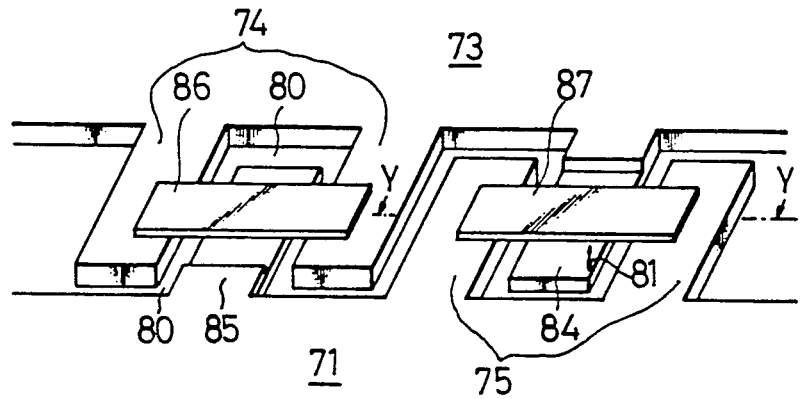
FIG. 19(b) shows details of the stoppers.

As shown in FIG. 19(b), the projections 84 of the weight 73 crossing the flat cross members 87, formed on the support 71 are thinner than other projections 74 of the weight 73 so that the gap 81 may be provided between the projections 84 and the flat cross members 87. Similarly, projections 85 of the support 71 crossing the flat cross members 86, formed on the weight 73 are thinner than other projections 75 of the support 71 so that the gap 81 may be formed between the projections 85 and the flat cross members 86. In this embodiment, the same effects and advantages as those of the embodiment shown in FIG. 15 can be obtained.

In this case, the cross members are formed flat, and hence they may be readily manufactured in a simple manner, and the gap 81 between the cross members and the projections can be designed to be a large interval and readily and accurately determined.

FIG. 20 shows an eighth manufacturing method for the semiconductor accelerometer shown in FIG. 19.

In FIG. 20, the left-hand side is a sectional view, taken along the line X—X of FIG. 19(a), and the right-hand side is a sectional view, taken along the line Y—Y of FIG. 19(b).

Figure 20A:
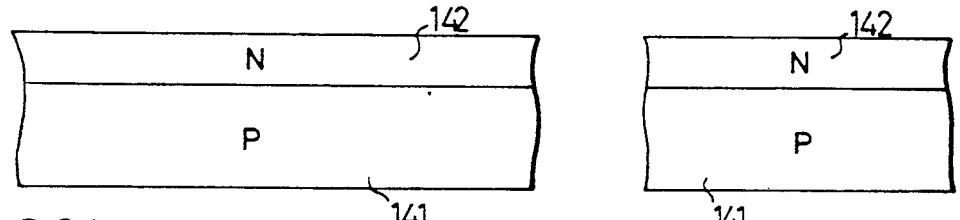
FIG. 20 is a cross section showing in steps (a) to (j) of an eighth manufacturing method of the present invention applicable to the semiconductor accelerometer shown in FIG. 19; accelerometer according to a fourth embodiment of the present invention.

In FIG. 20(a), an n-type silicon layer 142 of a predetermined thickness (for example 10 μm) is grown on a (100) surface of a p-type silicon substrate 141 by the epitaxial growing method.

Figure 20B:
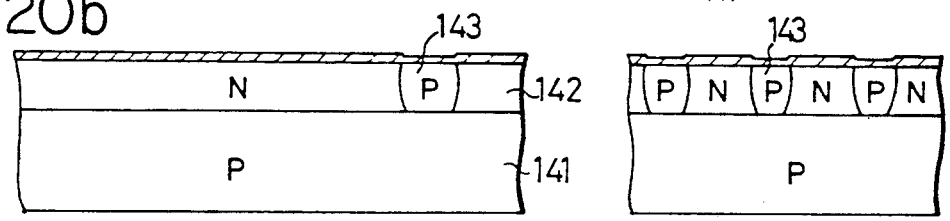

In FIG. 20(b), a first p-type region 143 is formed in a part of the n-type silicon layer 142 to reach the p-type silicon substrate 141 by the impurity doping. The p-type region 143 will form the gaps 79 and 80. Alternatively, the n-type impurity may be doped into the upper partial portions of the p-type silicon substrate 141 to simultaneously form the n-type silicon layer 142 and the p-type region 143.

Figure 20C:
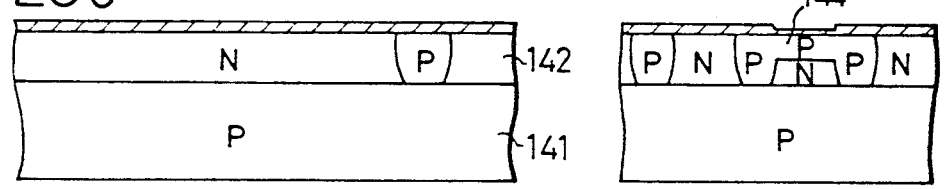

In FIG. 20(c), second p-type regions 144 which are shallower than the n-type silicon layer 142, are formed in predetermined regions by the impurity doping. The p-type regions 144 will form the gaps 81, between the cross members 86 and 87 and projections 85 and 84.

Figure 20D:
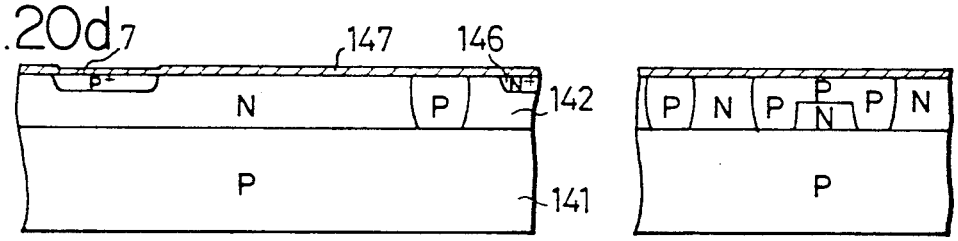

In FIG. 20(d), a piezoresistor 78 is formed in the surface region of the n-type silicon layer 142 by the p-type impurity doping. When required, a high-concentration n⁺-type region 146 is formed as an ohmic contact region for the n-type silicon layer 142 when carrying out the electrochemical etching by the impurity doping. An insulation film such as an SiO₂ film or an Si₃N₄ film is formed as a surface protective film 147.

Figure 20E:
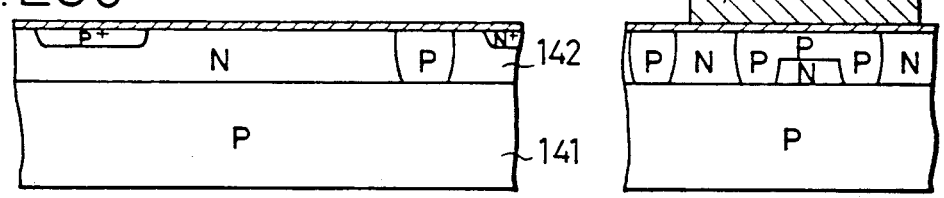

In FIG. 20(e), a single or composite film of polycrystalline silicon, SiO₂, PSG or Si₃N₄ is formed and patterned to form cross members 148.

Figure 20F:
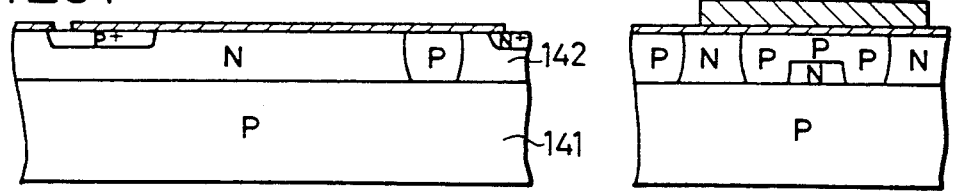

In FIG. 20(f), certain regions of the surface protective film 147 are removed by photoetching.

Figure 20G:
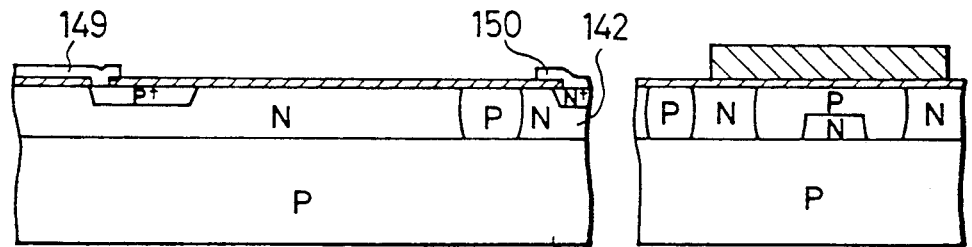

In FIG. 20(g), a piezoresistor lead 149 and a voltage applying electrode 150 to be used for the electrochemical etching are formed. The lead 149 and electrode 150 may be prepared by monolayer or composite films of metal such as Al, Cr, Au, Ti and Ni.

Figure 20H:
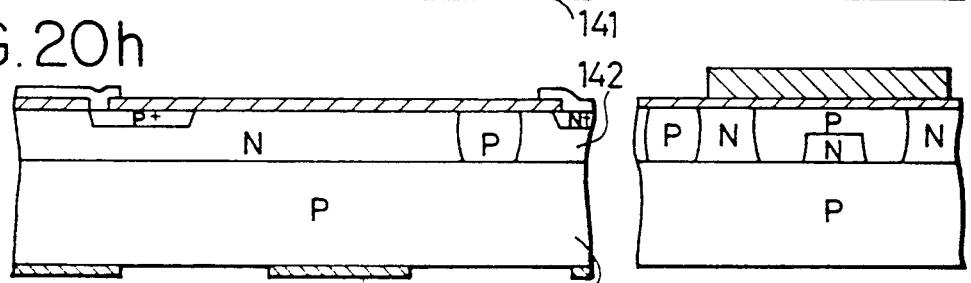

In FIG. 20(h), a SiO₂ or Si₃N₄ film is formed as a silicon etching mask 151 in the proper portions on the back of the substrate 141.

Figure 20I:
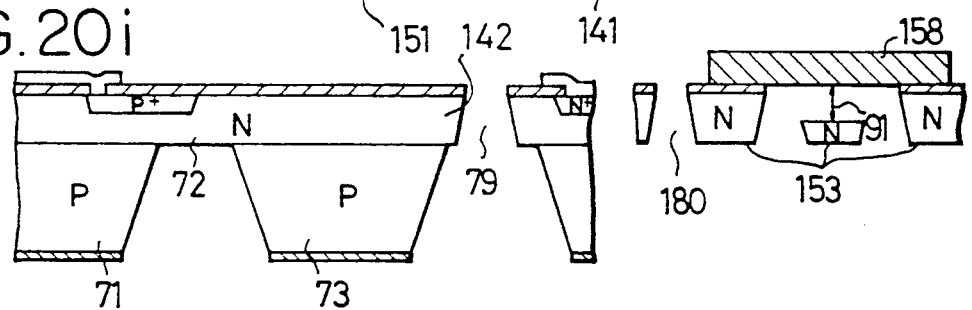

In FIG. 20(i), the voltage applying electrode 150 used as an anode, and the silicon layer etching is carried out by the electrochemical etching using the alkali etching solution. As a result, the support frame 71, the silicon cantilevered beam 72, the silicon weight 73 and the gap 79, as well as the projections 153, the cross members 158 and the gaps 80 are formed at the same time. At this time, the interval of the gaps 81 (91) between the cross members and the projections is determined by the thickness of the second p-type regions 144, and thus the gaps 81 can be precisely controlled.

In this manufacturing method, the voltage applying electrode 150 for the electrochemical etching is formed together with the piezoresistor lead 149 at the same time. However, it may be possible to form the lead 149 firstly and then to form the electrode 150 on the entire surface through the insulation film.

Figure 20J:
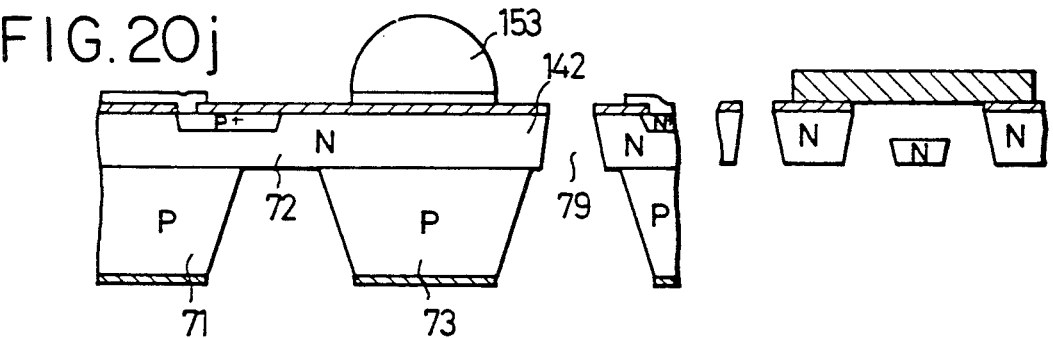

In FIG. 20(j), a metal weight 153 may be formed on the silicon weight 73 in the same manner as the embodiment shown in FIG. 14 with the same effects and advantages.

This embodiment of the present invention can be also applicable to the multiple beam structures in the same manner as the embodiments described above.

Figure 21A:
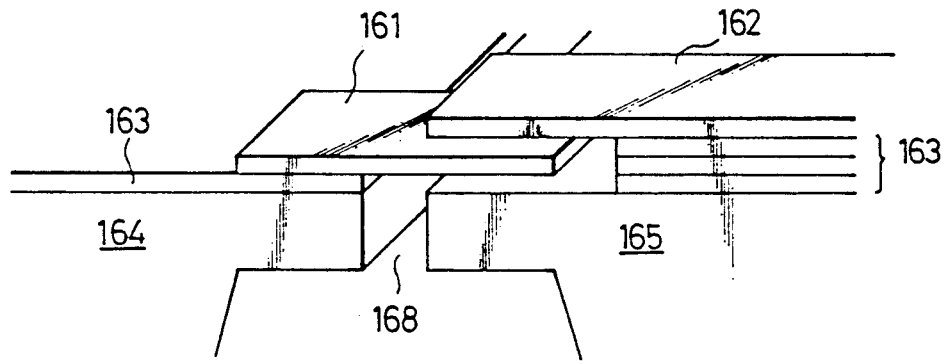
FIG. 21(a) is a fragmentary enlarged views of this embodiment.
Figure 21C:
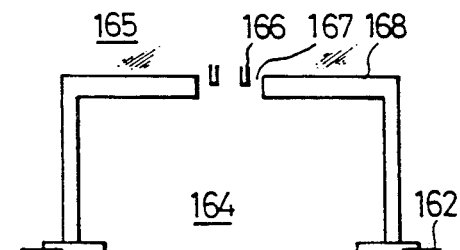
FIGS. 21(b) to (d) are top view showing modified arrangements of projections for stoppers of the accelerometer.
Figure 21B:
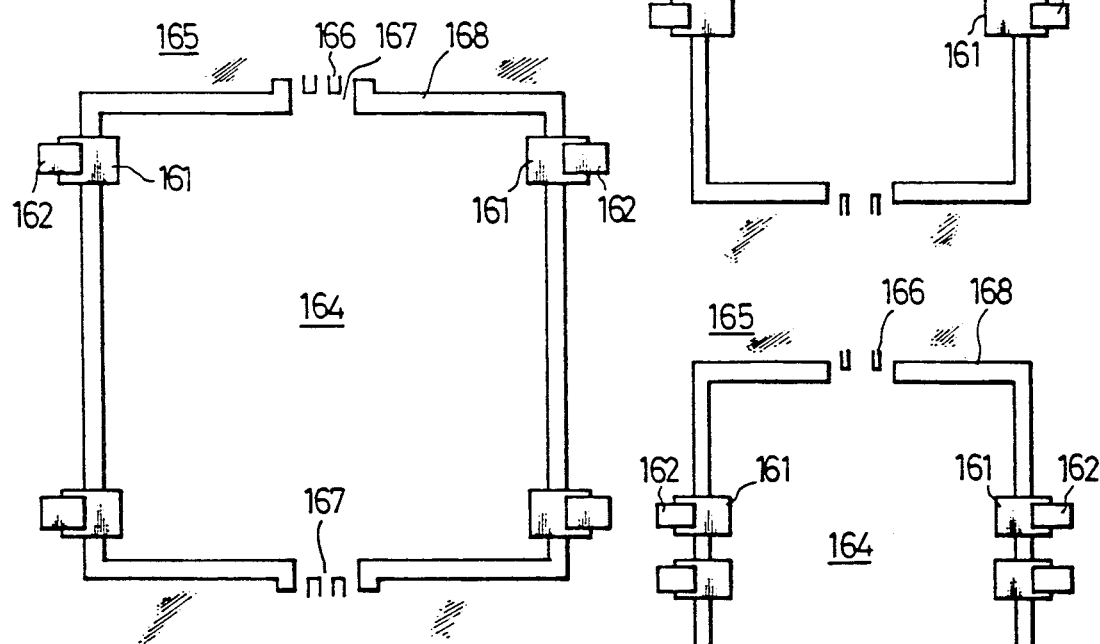
Figure 21D:
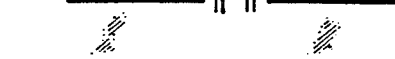

FIG. 21 shows a further embodiment of a semiconductor accelerometer according to the present invention, in which FIG. 21(a) is a fragmentary enlarged perspective view, FIG. 21(b) a top view and FIG. 21(c) a top view showing modified arrangements of projections for stoppers of the accelerometer.

In FIG. 21, the accelerometer comprises a support 165, a rectangular center mass or weight 164 arranged in a central opening thereof with a certain gap 168 between the support 165 and the weight, two beams 167 for connecting the central front and rear sides of the weight 164 to the support 165, and two pairs of piezoresistors 166 attached to the surfaces of the beams 167.

As shown in FIGS. 21(a) and 21(b), first projections 161 are attached to the right and left sides of the weight 164 through spacers 163 to extend outwards, and second projections 162 are mounted to the support 165 through the spacers 163 to extend inwards so that the first projections 161 may be positioned between the second projections 162 and the surface of the support 165 with proper gaps therebetween. In this case, the thicknesses of the spacers 163 for mounting the first and second projections 161 and 162 may be properly determined depending on the gaps between the first projections 161 and the second projections 162 and between the first projections 161 and the surface of the support 165.

It is readily understood that the first and second projections 161 and 162 and the support 165 constitute stoppers for restricting the displacement of the weight 164. Further, in turn, the first and second projections 161 and 162 may be mounted to the weight 164 and support 165 so that the second projections 162 may be positioned between the first projections 161 and the weight 164, with the same effects and advantages as those described above.

As shown in FIG. 21(c), a pair or pairs of the first and second projections 161 and 162 may be preferably disposed in symmetrical positions with respect to the center of gravity of the weight 164, resulting in effectively controlling the displacements of the beams 167 and weight 164.

Figure 22:
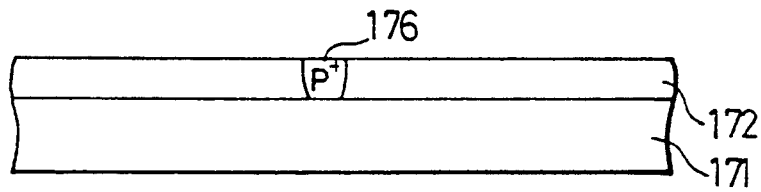
FIG. 22 is a cross section showing in steps (a) to (g) a ninth manufacturing method of the present invention applicable to the semiconductor accelerometer shown in FIG. 21.
Figure 22:
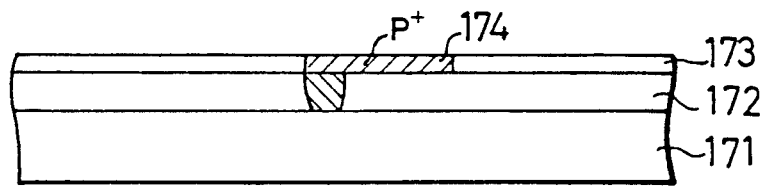
Figure 22:
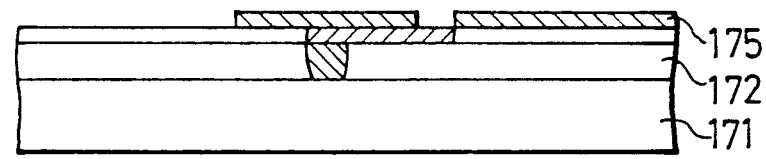
Figure 22:
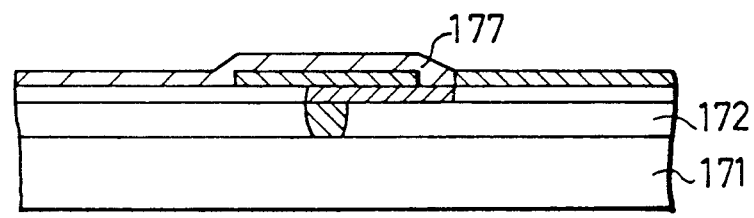
Figure 22:
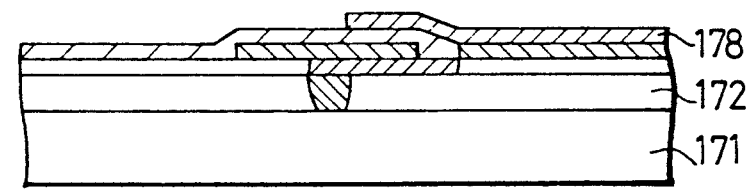
Figure 22:
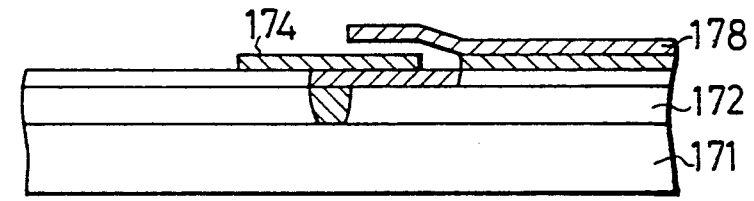
Figure 22:
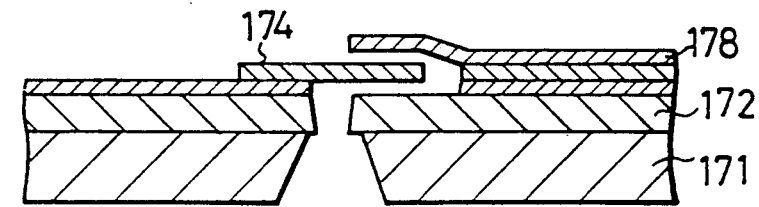

FIG. 22 shows a ninth manufacturing method for the semiconductor accelerometer shown in FIGS. 21.

In FIG. 22(a), a first n-type epitaxial layer 172 of the same thickness as that of the beams 167 is grown on a p-type silicon substrate 171. A p-type diffusion layer 176 for forming the gap 168 between the weight 164 and the support 165 is formed.

In FIG. 22(b), a second n-type epitaxial layer 173 for a lower spacer 163 is grown, and a p-type diffusion layer 174 for the gaps between the first projections 161 and the support 165 is formed.

In FIG. 22(c), an n-type polycrystalline silicon layer 175 for forming the first projections 161 and the spacer 163 is formed and patterned.

In FIG. 22(d), a PSG layer 177 having a thickness corresponding to the gap between the first and second projections 161 and 162 is formed.

In FIG. 22(e), an n-type polycrystalline silicon layer 178 for the second projections 162 is formed and patterned.

In FIG. 22(d), a PSG layer 177 having a thickness corresponding to the gap between the first and second projections 161 and 162 is formed.

In FIG. 22(e), an n-type polycrystalline silicon layer 178 for the second projections 162 is formed and patterned.

In FIG. 22(f), the PSG layer 647 is etched to form the gap between the first and second projections 161 and 162.

In FIG. 22(g), the back of the substrate 171 is electrochemically etched to remove the part of the substrate 171 and the p-type diffusion layers 176 and 174 to obtain the accelerometer shown in FIG. 21.

Operation of this accelerometer will be described with reference to FIG. 23.

In FIG. 23(a), when no acceleration is applied to the accelerometer, the first projections 161 do not contact with the second projections 162 and the support 165 with the predetermined gaps between them. When a small acceleration within an allowable range is applied to the accelerometer, the silicon weight 164 moves so as to displace the first projections 161, but the first projections 161 do not contact with the second projections 162 and the support 165.

In FIGS. 23(b) and 23(c), when an excessive acceleration is applied to the accelerometer of a very large resonance occurs in the accelerometer, the weight 164 moves so as to displace largely the first projections 161, and however, the first projections 161 contact the second projections 162 or the support 165 and thus are stopped thereby. In this way, even when the beams of the accelerometer are going to be displaced excessively by the excessive acceleration, they can be stopped at certain magnitude and be prevented from breaking.

Such a limit of displacement of the beam is determined by the thicknesses of the second n-type epitaxial layer 173 and the PSG layer 177, as shown in FIG. 21.

The thickness of the layers can be precisely controlled, and the gaps for the stoppers can be formed very accurate.

Since the projections 161 and 162 constituting the stoppers are formed during the wafer process, the yield of the accelerometers can be improved with a cost reduction.

Moreover, the stoppers prevents the beams from breaking during the manufacturing and mounting processes of the accelerometers.

Figure 24A:
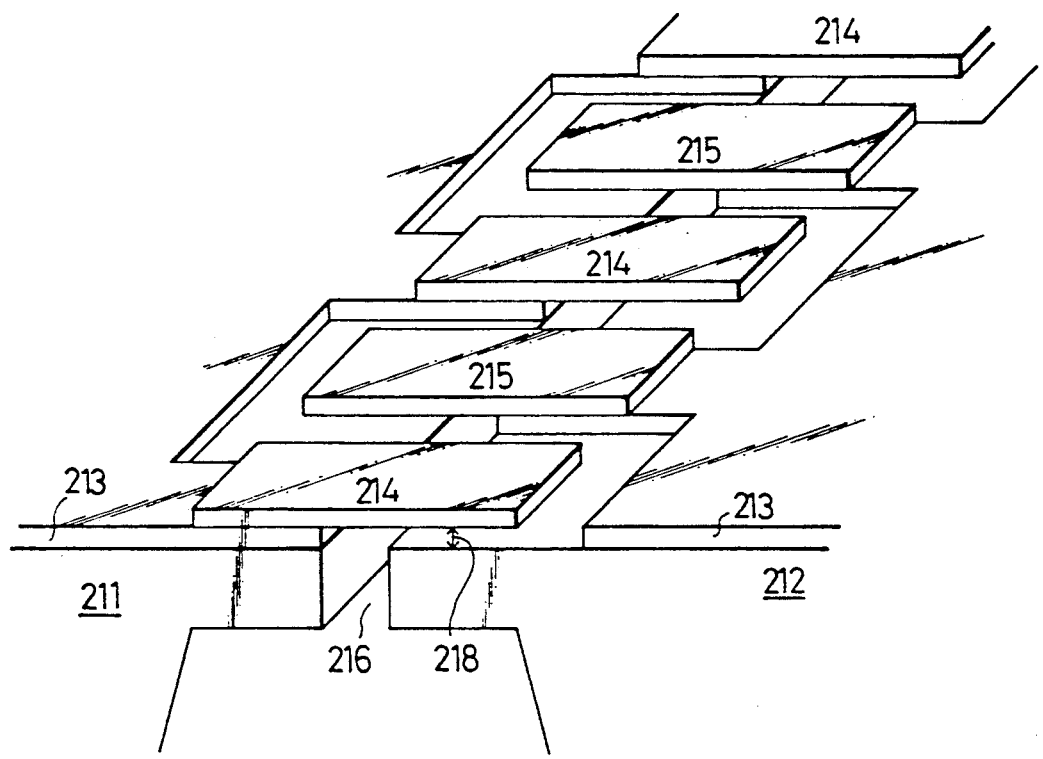
FIG. 24 shows a further embodiment of a semiconductor accelerometer according to the present invention; FIGS. (a) to (c) showing details of the construction of this embodiment.
Figure 24B:
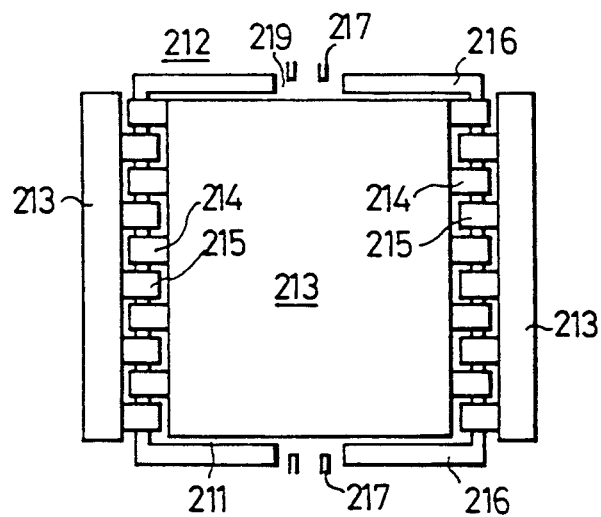
Figure 24C:
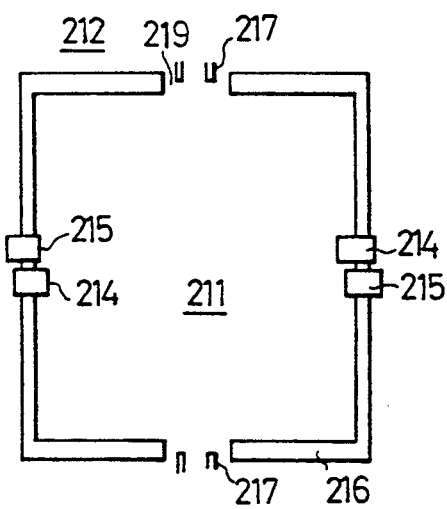

FIG. 24 shows still another embodiment of a semiconductor accelerometer according to the present invention, in which FIG. 24(a) is a fragmentary enlarged perspective view showing an essential part, FIG. 24(b) a top view, and FIG. 24(c) a top view showing arrangement of pairs of projections.

As shown in FIG. 24, the accelerometer has the basically the same structure as the one shown in FIG. 21, and comprises a support 212, a rectangular center mass or weight 211 placed in a central opening thereof with a proper gap 216 therebetween, two beams 219 for connecting the front and rear sides of the weight 211 to the support 212, and piezoresistors 217 attached to the surfaces of the beams 219. First projections 214 are mounted to the right and left sides of the weight 211 via a spacer 213 to extend outwards, and second projections 215 are disposed to the support 212 via spacer 213 to extend inwards so that the first and second projections 214 and 215 may be alternately arranged one another in the same height while there is a proper gap 218 (e.g., 2 $\mu$m) between each first projection 214 the support 212 and between the second projection 215 and the weight 211.

Although the present invention is applied to the two beam accelerometer in this embodiment, as shown in FIG. 24, the present invention can also be applied to semiconductor accelerometers with any number of beams.

In FIG. 24(c), pairs of the first and second projections 214 and 215 are preferably arranged in the symmetrical positions with respect to the center of gravity of the weight 211, with the result of effectively stopping the displacement of the beams and weight.

FIG. 25 shows a tenth manufacturing method for the semiconductor accelerometer shown in FIG. 24.

Figure 25A:
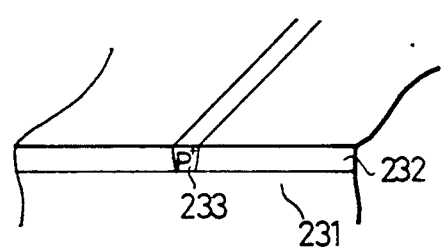
FIG. 25 is a perspective view showing in steps (a) to (h) a tenth manufacturing method of the present invention applicable to the semiconductor accelerometer shown in FIG. 24.

In FIG. 25(a), an n-type epitaxial layer 232 is grown on a p-type silicon substrate 231, and a p$^+$-type diffusion region 233 for the gap 216 of FIG. 24 is formed.

Figure 25B:
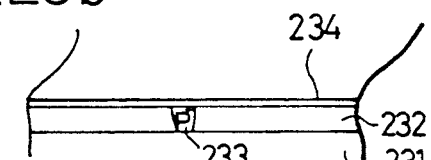

In FIG. 25(b), piezoresistors and leads are formed (not shown), and a SiO$_2$ film 234 is formed on the surface of the epitaxial layer 232.

Figure 25C:
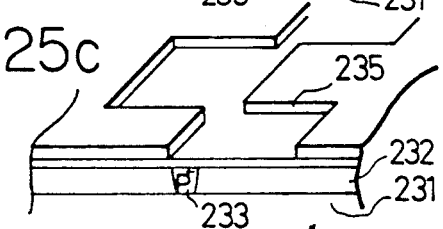

In FIG. 25(c), an n-type polycrystalline silicon layer 235 having a thickness corresponding to the gaps 218 between the projections 215 and the weight 211 and between the projections 214 and the support 212 is formed and patterned.

Figure 25D:
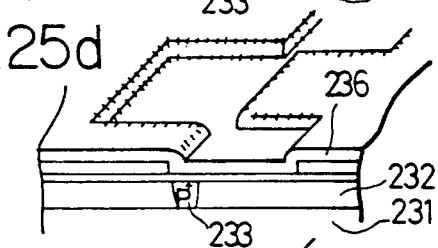
Figure 25E:
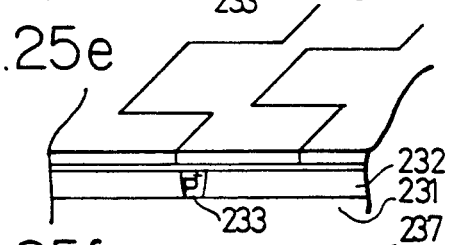

In FIG. 25(d), a PSG film 236 having the same thickness as that of the n-type polycrystalline silicon layer 235 is formed, and is patterned as shown in FIG. 25(c).

Figure 25F:
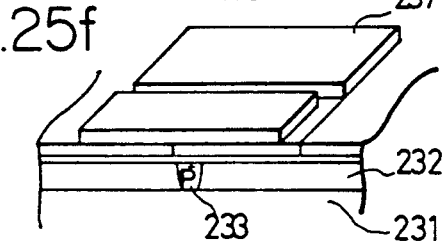

In FIG. 25(f), an n-type polycrystalline silicon layer 237 is formed and patterned to obtain the projections 214 and 215.

Figure 25G:
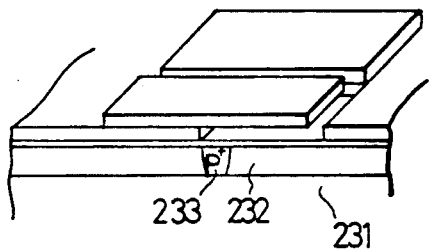

In FIG. 25(g), the PSG film 236 is etched to remove its unnecessary portions to complete the projections 214 and 215.

Figure 23:
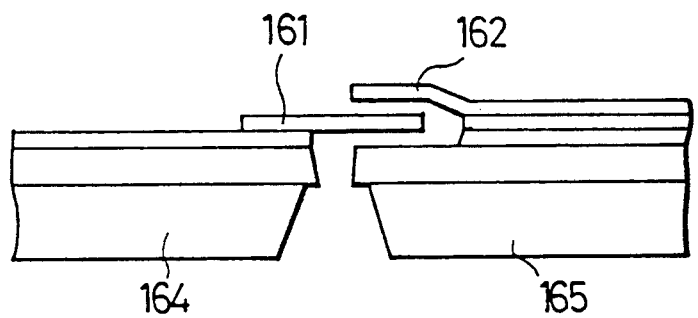
FIG. 23 are three cross-sections showing an operation of the accelerometer shown in FIG. 21.
Figure 23:
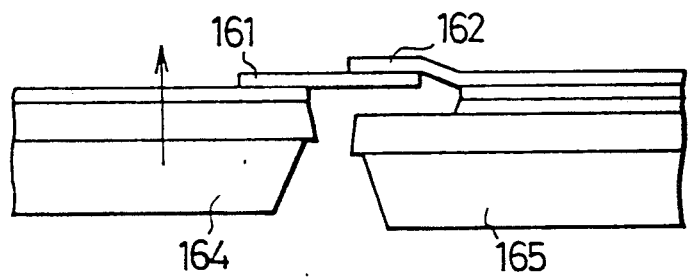
Figure 23:
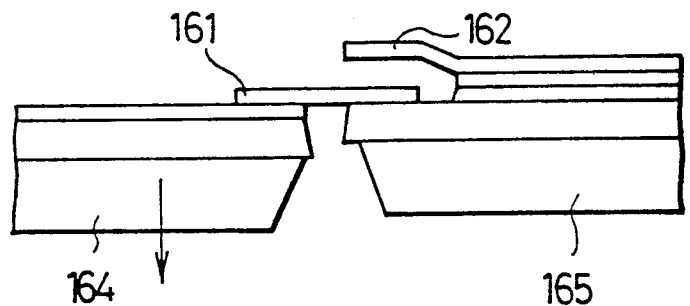
Figure 25H:
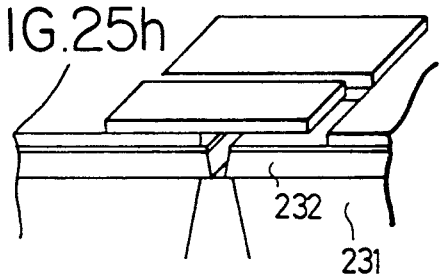

In FIG. 25(h), the beams 219 are formed, and the weight 211 and the support 212 are separated from each other by electrochemically etching the p-type silicon substrate 231 and the p⁻-type diffusion region 233 of the n-type epitaxial layer 232. thus completing the accelerometer shown in FIG. 23.

Figure 26A:
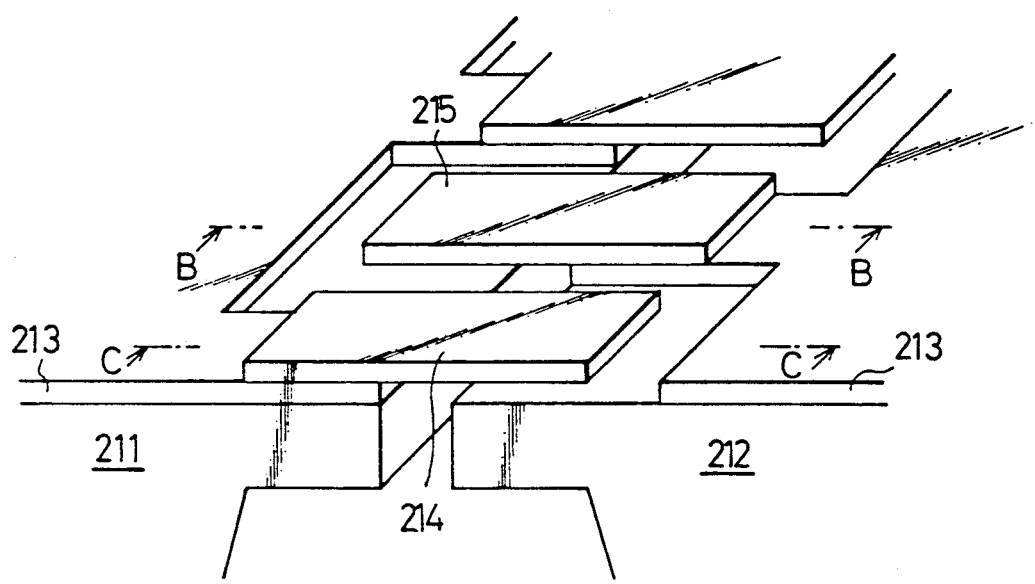
FIG. 26 shows the operation of the semiconductor shown in FIGS. (a) to (c) in FIG. 24.

The operation of this accelerometer will be described with reference to FIG. 26.

When no acceleration is applied. as shown in FIG. 25(a), the first and second projections 214 and 215 are apart from the support 212 and the weight 211 by the predetermined gaps 218.

When a small acceleration within an allowable measurement range is applied to the accelerometer, the weight 211 is moved in proportion to the applied acceleration. However, since the acceleration is within the allowable range. the first and second projections 214 and 215 are still in the floating state.

Figure 26B:
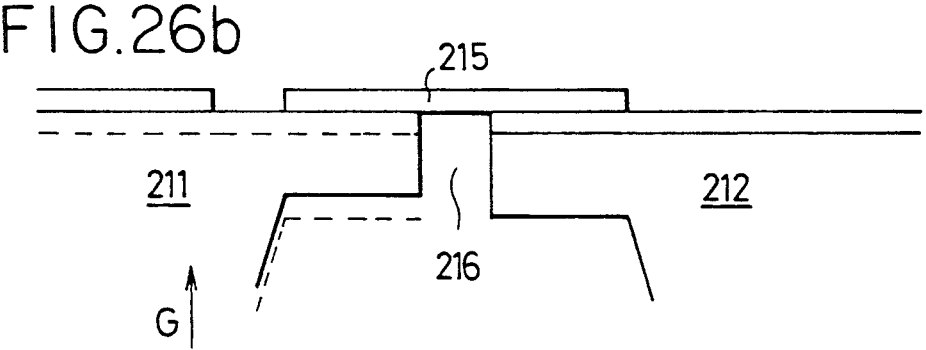
Figure 26C:
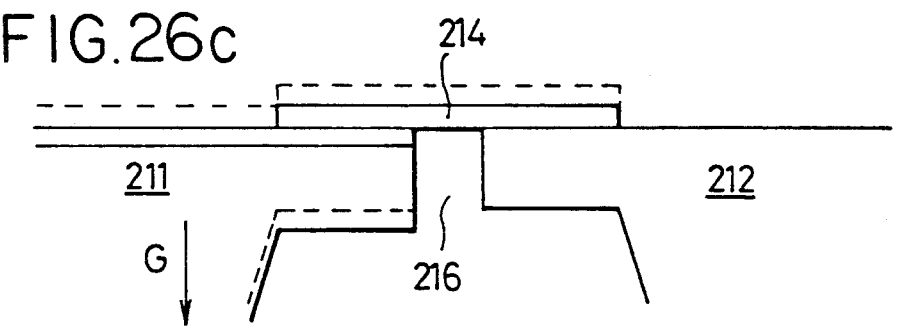

When an excessive upward acceleration G is applied to the accelerometer, as shown in FIG. 26(b). the weight 211 is largely moved upward, and is stopped by the second projections 215 so that it may not be displaced more than a predetermined distance.

When an excessive downward acceleration G is applied to the accelerometer, as shown in FIG. 25(c). the first projections 214 is also stopped by the support 212.

In this way, when the acceleration exceeding the allowable range is applied to the accelerometer, the first and second projections 214 and 215 stop the displacement of the weight 211 to prevent the beams from breaking.

The allowable measurement range of acceleration is determined by the gap 218 between the first projections 214 and the support 212 and between the second projections 215 and the weight 211. The gap 218 is equal to the thickness of the PSG film 236. as described above. Since the thickness of the PSG film 236 can be precisely controlled, the acceleration measuring limit can be precisely designed. For example, when the displacement with respect to the acceleration of 1G is defined to 0.5 μm and the displacement of the weight is intended to be stopped against the acceleration of 4G, the thickness of the PSG film 236 may be determined to 2 μm.

Figure 27A:
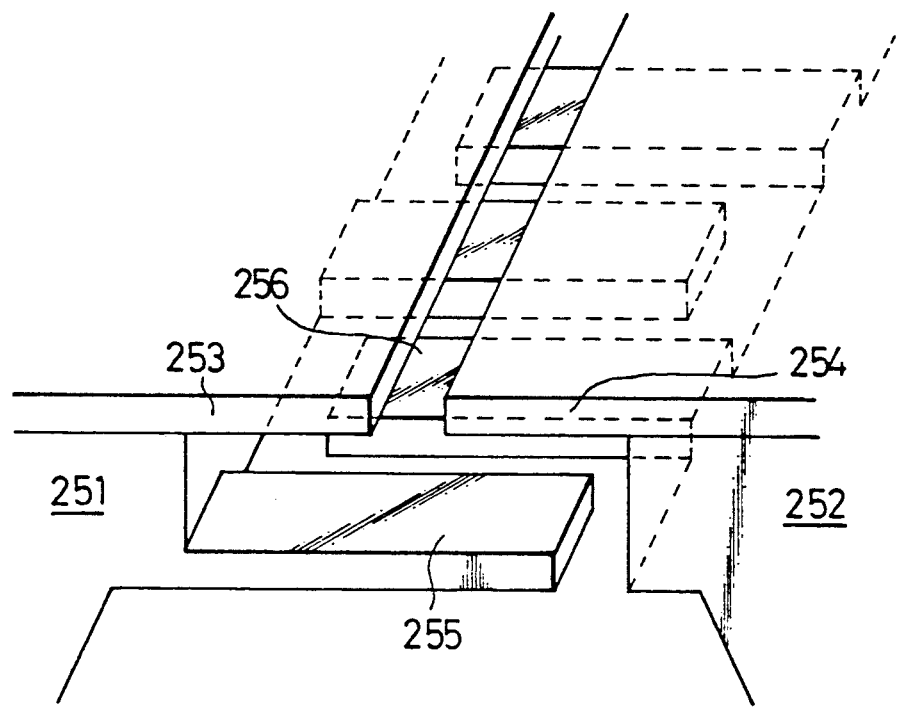
FIG. 27 shows still another embodiment of a semiconductor accelerometer according to the present invention FIGS. (a) to (b) showing, respectively, a perspective and a cross sectional view of this embodiment.
Figure 27B:
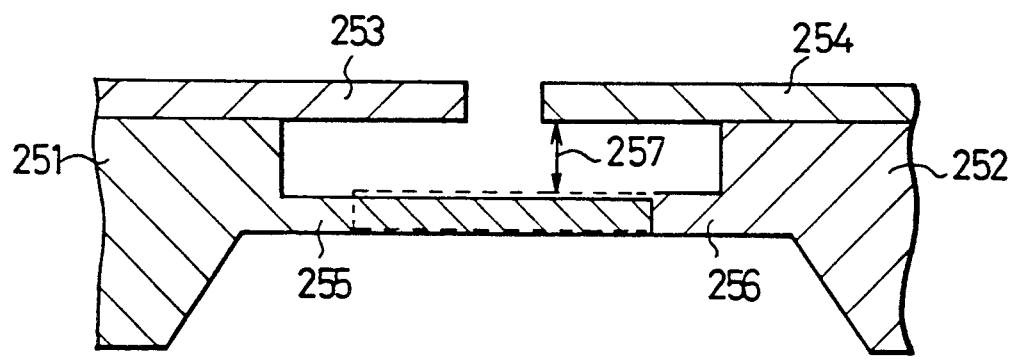

FIG. 27 shows another embodiment of a semiconductor accelerometer according to the present invention, in which FIG. 27(a) is a fragmentary enlarged perspective view of an essential part, and FIG. 27(b) a sectional view of the essential part. Remaining portions of this embodiment are the same as those of the embodiment shown in FIG. 24.

In this embodiment, a weight 251 is provided with a first stopper member 253 on its upper surface and with first projections 255 extending outwards in parallel with the first stopper member 253 with a proper gap 257 (e.g., several μm to several tens μm), and a support 252 is provided with a second stopper member 254 on its upper surface and with second projections 256 extending inwards in parallel with the second stopper member 254 with the gaps 257. The first and second stopper members 253 and 254 are facing to each other at a certain gap in the same height, and the first and second projections 255 and 256 are alternately arranged in the same height.

In this embodiment, when the excessive acceleration is applied to the accelerometer, the weight 251 is moved largely, and the projections 255 of the weight 251 are stopped by the stopping member 254 of the support 252, or the projections 256 of the support 252 are stopped by the stopping member 253 of the weight 251 to stop the displacement of the weight 251 to prevent the beams from breaking.

This embodiment is easily manufactured by, for example, the manufacturing method shown in FIG. 25.

The stopping member 253 of the weight 251 and the stopping member 254 of the support 252 may be formed by silicon, similar to the projections 255 of the weight 251 and the projections 256 of the support 252. Also, they may be formed of a thin film or a composite film made of $SiO_2$, $Si_3N_4$ or polycrystalline silicon.

According to this embodiment, stopper mechanisms such as the projections are not formed at upper and lower portions of the weight, but they are formed in space between the weight and the support frame, thereby making the accelerometer compact. Further, the stopper mechanisms are formed during the wafer process, and the yield of the accelerometers can be improved and the cost is reduced.

According to the present invention, the beams of accelerometers are protected by their stopper mechanisms during the manufacturing and mounting processes, and, naturally, during the actual use of them, from the application of excessive acceleration.

What is claimed is:

1. A semiconductor accelerometer, comprising:
   a weight;
   a support frame surrounding the weight, with a gap therebetween;
   at least one beam for connecting the weight to the support frame;
   means for detecting acceleration attached to the beam; and
   stopper means for restricting the movement of the weight relative to the support frame,
   the stopper means comprising:
   at least one first projection integrally mounted to the weight; and
   at least one second projection integrally mounted to the support frame. the first and second projections overlapping at least their portions with each other in the moving direction of the weight with a certain gap between the first and second projections.

2. The accelerometer of claim 1, wherein the acceleration detecting means is a piezoresistor.

3. A semiconductor accelerometer, comprising:
   a weight;
   a support frame surrounding the weight, with a gap therebetween;
   at least one beam for connecting the weight to the support frame;
   means for detecting acceleration attached to the beam; and
   stopper means for restricting the movement of the weight relative to the support frame,
   the stopper means comprising:
   at least two first projections integrally mounted to the weight;
   at least two second projections integrally mounted to the support frame, the first and second projections alternately aligning in a plane approximately perpendicular to the moving direction of the weight, with a first gap between the first and second projections;
   at least one first cross member crossing over one of the second projections with a second gap therebetween and connecting adjacent two of the first projections; and
   at least one second cross member crossing over one of the first projections with the second gap therebetween and connecting adjacent two of the second projections.

4. The accelerometer of claim 3, wherein the acceleration detecting means is a piezoresistor.

5. The semiconductor accelerometer of claim 3, wherein the first and second cross members are flat, and the second and first projections under the first and second cross members are thinner than remaining ones of the second and first projections.

6. A semiconductor accelerometer, comprising:
a weight,
a support frame surrounding the weight with a gap therebetween;
at least one beam for connecting the weight to the support frame;
means for detecting acceleration, attached onto the beam; and
stopper means for restricting the movement of the weight relative to the support frame,
the stopper means comprising:
at least one first projection integrally mounted to the weight; and
at least one second projection integrally mounted to the support frame, the first projection extending toward the support frame to interpose between the second projection and the support frame with certain gaps therebetween.

7. The accelerometer of claim 6, wherein the acceleration detecting means is a piezoresistor.

8. A semiconductor accelerometer, comprising:
a weight;
a support frame surrounding the weight with a gap therebetween;
at least one beam for connecting the weight to the support frame;
means for detecting acceleration, attached onto the beam; and
stopper means for restricting the movement of the weight relative to the support frame,
the stopper means comprising:
at least one first projection integrally mounted to the weight; and
at least one second projection integrally mounted to the support frame, the second projection extending toward the weight to interpose between the first projection and the weight with certain gaps therebetween.

9. The accelerometer of claim 8, wherein the acceleration detecting means is a piezoresistor.

10. A semiconductor accelerometer, comprising:
a weight;
a support frame surrounding the weight, with a gap therebetween;
at least one beam for connecting the weight to the support frame;
means for detecting acceleration attached to the beam; and
stopper means for restricting the movement of the weight relative to the support frame,
the stopper means comprising:
at least two first projections extending from the weight to overlap with the support frame with a certain gap therebetween; and
at least two second projections extending from the support to overlap with the weight with the certain gap therebetween, the first and second projections alternately aligning in a plane approximately perpendicular to the moving direction of the weight with a gap between the first and second projections.

11. The accelerometer of claim 10, wherein the acceleration detecting means is a piezoresistor.

12. A semiconductor accelerometer, comprising:
a weight;
a support frame surrounding the weight, with a gap therebetween;
at least one beam for connecting the weight to the support frame;
means for detecting acceleration, attached onto the beam; and
stopper means for restricting the movement of the weight relative to the support frame,
the stopper means comprising:
a first stopping member disposed on the support frame;
a second stopping member disposed on the weight;
at least two first projections extending from the weight to position under the first stopping member with a certain gap therebetween; and
at least two second projections extending from the support frame to position under the second stopping member with the certain gap therebetween, the first and second projections alternately aligning in a plane approximately perpendicular to the moving direction of the weight with a gap between the first and second projections.

13. The accelerometer of claim 12, wherein the acceleration detecting means is a piezoresistor.

* * * * *